(12) United States Patent
Elwalid et al.

(10) Patent No.: US 6,567,415 B1
(45) Date of Patent: May 20, 2003

(54) PACKET SCHEDULING IN A COMMUNICATION NETWORK WITH STATISTICAL MULTIPLEXING OF SERVICE CLASSES

(75) Inventors: Anwar Elwalid, Murray Hill, NJ (US); Debasis Mitra, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/273,433

(22) Filed: Mar. 20, 1999

(51) Int. Cl.$^7$ .............................................. H04L 12/28
(52) U.S. Cl. ...................................... 370/412; 370/468
(58) Field of Search .......................... 370/395.1, 395.2, 370/395.21, 395.4, 395.41, 395.42, 395.43, 412–418, 468; 708/1, 100, 160, 490, 508

(56) References Cited

U.S. PATENT DOCUMENTS

| | | | | | |
|---|---|---|---|---|---|
| 5,971,822 | A | * | 10/1999 | Lyles et al. | 370/395.4 |
| 6,067,298 | A | * | 5/2000 | Shinohara | 370/395.71 |
| 6,072,800 | A | * | 6/2000 | Lee | 370/412 |
| 6,075,791 | A | * | 6/2000 | Chiussi et al. | 370/412 |
| 6,359,861 | B1 | * | 3/2002 | Sui et al. | 370/230 |
| 6,389,019 | B1 | * | 5/2002 | Fan et al. | 370/395.42 |
| 6,408,005 | B1 | * | 6/2002 | Fan et al. | 370/412 |

* cited by examiner

*Primary Examiner*—David Vincent
(74) *Attorney, Agent, or Firm*—De La Rosa & De La Rosa, LLC

(57) ABSTRACT

This Generalized Processor Sharing (GPS) is the basis for the packet scheduler of choice in IP routers and ATM switches of the future. The currently accepted approach for the design of GPS schedulers is based on deterministic QoS guarantees, which, it is generally accepted, is overly conservative and leads to limitations on capacity. To address this problem we develop a framework for GPS scheduling which is based on statistical QoS guarantees and statistical multiplexing. We give the design of GPS weights which maximize the coverage of operating points, and also the design of the connection admission control (CAC). The general framework is end-to-end, with two heterogeneous QoS classes coexisting with a third, best effort class. Each QoS class has a specified delay bound together with a bound on the probability of its violation. An important objective is to maximize the bandwidth available to best effort traffic while just satisfying the guarantees of the QoS classes. To this end, we consider output regulated GPS scheduling which has the additional feature of limiting each connection's share of the bandwidth to a specified value, a design parameter which is determined by our analysis. The sources are subject to standard dual leaky bucket regulation. For the design of the GPS weights we give procedures based on two key concepts, the realizable set and the critical weights. The realizable set is the union of all admissible sets of connections of both classes over all weights. One of the main contributions is a pragmatic design process by which most of the realizable set is realized by only two critical weights. In the benign case, the system is "effectively homogeneous" and a single GPS weight suffices, while in the complementary "effectively non-homogeneous" case it is necessary to switch between the critical weights. The numerical results, which are for a single node with a wide range of traffic and QoS parameters, validate the design procedure and also show that there are substantial capacity gains from statistical multiplexing.

24 Claims, 7 Drawing Sheets

PACKET SCHEDULING IN A COMMUNICATION NETWORK WITH STATISTICAL MULTIPLEXING OF SERVICE CLASSES

FIELD OF THE INVENTION

This invention relates to the field of methods for regulating traffic in a communications network. More particularly, this invention relates to generalized processor sharing (GPS) schedulers, and specifically, to GPS schedulers which statistically multiplex heterogeneous quality of service (QoS) classes.

BACKGROUND OF THE INVENTION

A communications network is one means for transmitting or carrying traffic (e.g., signals representing information such as data, voice, text, and/or video) between endpoints (e.g., host machines, fax machines, or terminals) connected to the network. The network comprises nodes connected, to each other and to the endpoints, by links. Typically, each link is bi-directional (i.e., traffic may be conveyed or transmitted in the forward and reverse directions), and each link is characterized by parameters, such as bandwidth or capacity in each direction. The nodes advantageously include buffers. If a link does not have a sufficient available bandwidth to carry traffic received at a node, a buffer in the node may be used to store the received traffic until such time as the link has a sufficient available bandwidth.

Networks are increasingly being used for the reliable, high-speed transmission of traffic between endpoints over wide areas. This increased use is bringing major changes to network services and architecture/infrastructure design. In particular, a wide spectrum of new consumer and business services, such as video-on-demand and video teleconferencing, are expected to be offered on Broadband Integrated Services Digital Networks (BISDN) as well as Internet telephony. These new services will be characterized by a wide range of traffic characteristics (e.g., bandwidth) and with different quality of service (QoS) requirements (e.g., maximum delay through the network and maximum information loss rate). The principal technique for transmission in BISDN is Asynchronous Transfer Mode (ATM). See, for example, S. E. Minzer, "Broadband ISDN and Asynchronous Transfer Mode," IEEE Comm. Mag., pp. 17–24. September 1989. Other transmission techniques include Internet Protocol (IP), among others.

When traffic is to be carried in an ATM network, an initiating endpoint requests that a bi-directional path (i.e., a connection comprising nodes and links) be established in the network between the initiating endpoint and a specified destination endpoint. In an ATM network, the path that is established is a so-called "virtual circuit" (VC) by which it is meant that the initiating endpoint simply specifies the destination endpoint, and the network carries the traffic from the initiating endpoint to the destination endpoint as though they are connected by a direct circuit. A VC is also referred to herein as a connection. Traffic in an ATM network is formatted into cells or packets. Note that in Internet Protocol networks, no connection is defined, but packets belonging to different flows are, however, identified.

Admission control policies govern whether the network can accommodate, for example, a request to establish a new VC. The admission decision is typically based on: (1) traffic descriptors (e.g., average bandwidth and burstiness) characterizing the traffic to be carried and (2) any quality of service requirements for the traffic. The admission decision will also be based on what resources are available in the network (e.g., the amount of unused bandwidth in the links, and the unused buffer space in nodes) to accommodate the request. A request for admission typically will specify or provide the traffic descriptors. The network will, in turn (based on the specified traffic descriptors), determine the amount of network resources that will need to be assigned to the request. Based on the determination, the network will decide whether to admit the request. If the request is admitted, a "contract" is made by which the network agrees to carry the traffic and to meet any quality of service guarantees so long as the traffic stays within the specified traffic descriptors. The performance of ATM or IP networks depends on admitted connections complying with their contracts. For example, congestion may be caused by an endpoint supplying information to the network so as to exceed contract specifications, thereby causing statistical fluctuations in the traffic flow through the network. Such fluctuations can degrade network performance and affect quality of service levels for other connections in the network. Accordingly, a network typically monitors, or controls traffic on, connections to ensure that the connections comply with their contracts.

Various techniques have been proposed to monitor and control traffic on networks, as well the allocated resources. Generalized Processor Sharing (GPS) provides the basis for the packet scheduler of choice in Internet Protocol (IP) routers and ATM switches of the future. See, e.g., S. Keshav, *An Engineering Approach to Computer Networking*, Addison-Wesley, Reading, Mass., 1997; G. Kesidis, *ATM Network Performance*, Kluwer, Boston, Mass., 1996; D. Stiliadis and A. Varma, "Rate-proportional servers: A design methodology for fair queueing algorithms", *IEEE/ACM Trans. Networking* 6, April 1998, pp. 164–74; and D. Stiliadis and A. Varma, "Efficient fair queueing algorithms for packet-switched networks", *IEEE/ACM Trans. Networking* 6, April 1998, pp. 175–85. A GPS scheduler defines how cells are serviced out of the buffer of a connection and sent over the link with a specified total link bandwidth.

The currently accepted approach for the design of the GPS scheduler and the control of networks which use it is based on deterministic QoS guarantees. In this connection, the work and bounds of Parekh and Gallager form an important and original point of reference. See, e.g., A. K. Parekh, "A generalized processor sharing approach to flow control in integrated services network", Ph.D. dissertation, LIDS-TH-2089, MIT, February 1992; A. K. Parekh and R. G. Gallager, "A generalized processor sharing approach to flow control—The single node case", *IEEE/ACM Trans. Networking* 1, June 1993, pp. 344–57; and Parekh et al. and R. G. Gallager, "A generalized processor sharing approach to flow control in integrated services network—The multiple node case", *IEEE/ACM Trans. Networking*, April 1994, pp. 137–50. However, it is generally accepted that the deterministic bounds using lossless multiplexing are overly conservative, thus limiting capacity and the utility of the approach to guide the design and operations of real networks.

SUMMARY OF THE INVENTION

To address the limitations of deterministic QoS guarantees, this invention develops a framework for GPS scheduling and network control which is based on statistical QoS guarantees and statistical multiplexing. We give the design of GPS weights which maximize coverage of operating points in the number of connections of heterogeneous QoS classes with only a very small repertoire of weights, together with the associated design of connection admission control (CAC). The gain in capacity is then typically significant.

The description and results presented here are in the framework of end-to-end QoS guarantees, but could be used in the context of any scheduling problem requiring QoS guarantees, including IP networks. We consider two heterogeneous QoS classes coexisting with a third, best effort class. These three classes are sometimes referred to in the industry as gold, silver and bronze QoS guarantees. The QoS classes have a specified end-to-end delay requirement together with a bound, typically quite small, on the probability of its violation, or loss. The role of the best effort traffic is important in our conceptual framework, and a high level objective is to maximize the bandwidth available to best effort traffic while just satisfying the guarantees of the QoS classes.

The main contributions of this invention are for a single node in which the service discipline is GPS. The procedure applies to each node on the end-to-end path, provided peak-rate regulation is carried out as described below, and provided an appropriate characterization, described below, is given of the traffic to each node.

There are $K=(K_1, K_2)$ connections or sources of the two QoS classes, and each connection's scheduling parameters are $\phi_j$ and $P_o^{(j)}$, for class j connections, where the weight $\phi_j$, in relation to the weights of the other connections, determines the connection's share of the bandwidth, which, however, is not allowed to exceed the peak rate $P_o^{(j)}$. Our analysis for the single node is carried out first with peak rate regulation absent, and this analysis is then used to select $P_o^{(\cdot)}$ such that the analysis still holds when peak rate regulation is operative. The QoS parameters for class j are $D_j$, the delay bound, and $L_j$, the loss probability. The class dependence is important, for in one representative example, class 1 is voice-like for which $D_1$ is small and $L_1$ large, while class 2 is premium data-like for which $D_2$ is large and $L_2$ small.

The source model is the fluid rate process which is adversarial while compliant with dual leaky bucket $(r,B_T,P)$ regulation, where r and P are the mean and peak rate constraints, respectively, and $B_T$ is the token buffer size. This is an on-off process, which we call the extremal regulated source process, that transmits at peak rate from the instant that the token buffer is full till it is empty, and then turns off and remains so till the token buffer is full.

The development of the single node analysis is in two phases, lossless multiplexing followed by statistical multiplexing. The former assumes that sources may collude and in this case the above on-off process is shown to be maximally adversarial. This phase parallels the standard analysis for deterministic guarantees, except for the additional element of the delay constraint. The analysis in the latter phase combines (i) the assumption of non-colluding sources, which gives statistical independence to the sources and uniformly distributed random phases to the individual sources' rate processes, and (ii) the use of the unutilized portions of the allocated resources to sources, which is not exploited in lossless multiplexing.

The GPS weights $(\phi_1, \phi_2)$ or, more specifically, the ratio $\phi \triangleq \phi_1/\phi_2$ (which we shall also refer to as a weight) are chosen as follows. The first step is to determine the admissible set $\mathcal{A}(\phi)$, i.e., for fixed $\phi$, the set of all $(K_1, K_2)$ such that the statistical QoS of each connection is satisfied. The size and shape of the admissible region depends strongly on the weight. It is easy to mismatch the GPS weight to the traffic and QoS parameters of the classes. For instance, if $\phi$ is excessively large then the admissible set is limited by the QoS considerations of the class 2 connections and is consequently small in size, with the relatively few class 1 connections receiving QoS in excess of their requirements. When the weight is not properly designed resources are misallocated and sharing is inhibited.

An important concept for GPS design is the realizable set $\mathfrak{R}$. This is the set of all $(K_1, K_2)$ which are contained in the admissible set of some weight $\phi$. That is, the realizable set is the union of the admissible set $\mathcal{A}(\phi)$ over all $\phi$. The role of the realizable set is as follows: say exogeneous (traffic and market) conditions dictate a desirable operating neighborhood in connections around the point $(K_1, K_2)$. If this neighborhood is contained in $\mathfrak{R}$ then an inverse problem is solved to obtain the appropriate weight. As the exogeneous conditions change, typically on a slow time scale, the GPS weight changes too in correspondence. Now, on the face of it, this notion is only of theoretical value with possibly little practical relevance, since the realization of all of $\mathfrak{R}$ may in principle require switching between a large, even possibly an uncountable, number of weights. One of the main contributions of this invention is to show by a pragmatic design approach that most of $\mathfrak{R}$ may be realized by either one or two weights. These are called critical weights, $\phi_c^{(1)}$ and $\phi_c^{(2)}$, and simple procedures for their calculations are given in this disclosure.

Next, we must determine whether one or two critical weights are needed. We classify the entire system, as characterized by the traffic and QoS parameters of both classes, to be either "Effectively Homogeneous" or "Effectively Non-Homogeneous", depending upon whether $\phi_c^{(1)} \leq \phi_c^{(2)}$ or otherwise. The former is the benign case and the midpoint between the critical weights is a suitable choice to realize almost all of $\mathfrak{R}$. In the latter case, realizing $\mathfrak{R}$ requires switching between the critical weights, which, as argued above, would occur on a slow time scale to track exogeneous traffic conditions. In particular, switching at this rate would be compatible with the tacit assumption in the analysis that steady state exists. In our numerical investigations we have encountered examples of effectively homogeneous systems in which there exists considerable disparity in traffic and QoS parameters between the classes.

Our numerical investigations consider a wide range of traffic and QoS parameters. The results reported here for the single node provide support for our pragmatic approach to the design problem, which is based on piece-wise linear approximations to the boundaries of the admissible and realizable regions, and, more specifically, for our claim that either one or two weights suffice to realize most of $\mathfrak{R}$. Finally, these results show that there are substantial capacity gains from statistical over deterministic, or lossless, QoS guarantees.

Proceeding to the network-wide context, the objective is to maximize carried best-effort traffic, while meeting the requirements of the QoS classes. This is the prime motivation for regulation of the peak rate of the output of the GPS schedulers. Output regulated GPS has the effect of allocating resources to the admitted QoS connections to just meet their requirements. There are further choices to be made regarding the delay budget, i.e., allocation of portions of the end-to-end delay to nodes in the path of the connection. An attractive option is to allocate the entire delay budget to the first node in the path. In the GPS framework one attraction, among others, of this invention is that the complexity of the GPS design is contained and the detailed analysis given here applies. Otherwise there is a proliferation of classes for which the GPS design problem is complexified, even though the basic framework of a single GPS node analysis of this invention remains intact.

BRIEF DESCRIPTION OF THE DRAWINGS

The features and advantages of the present invention will become more readily apparent from the following detailed description of the invention in which.

DETAILED DESCRIPTION OF THE INVENTION

The following detailed description of the inventive method is divided into the following sections. Section 1 outlines the preliminaries and the background facts. Section 2 discusses lossless multiplexing with deterministic guarantees, and Section 3 describes the single node analysis of statistical multiplexing and GPS design. Section 4 presents numerical investigations, and Section 5 discusses end-to-end design and performance. The conclusions are presented in Section 6.

1. Preliminaries and Background Facts 1.1 Flows, Rates, Dual Leaky Bucket Regulator Here we review some basic quantities and operations of the dual leaky bucket regulator (r, $B_T$, P), where r is the token (mean) rate, $B_T$ is the token buffer size and P is the peak rate. Traffic streams are modeled as fluid flow here and throughout this disclosure. Let U(t) and R(t) be rate processes, where U(t) is offered by the source and R(t) is the conforming process which is passed to the network by the regulator. We let $A_U(t, t+\tau)$ and $A_R(t, t+\tau)$ denote the total flows during the interval [t, t+τ] for the U and R rate processes, respectively, where rates and total flows are generally related thus:

$$A_R(t, t+\tau) = \int_t^{t+\tau} R(s) ds \quad (1.1)$$

The basic relation describing the conforming process R(t) is $$A_R(t, t+\tau) = \min(A_U(t, t+\tau), P_\tau, z(t)+r\tau) \forall t, \forall \tau>0 \quad (1.2)$$

In Eq. (1.2), z(t) is the token content of the token buffer at time t. The governing equations of z(t) are $$\frac{d}{dt}z(t) = r - R(t), \quad \text{if } 0 < z(t) < B_T \\ = [r - R(t)]^+, \quad \text{if } z(t) = 0 \\ = [r - R(t)]^-, \quad \text{if } z(t) = B_T \quad (1.3)$$

It may be verified that the regulated rate process R(t) is constrained thus, $$R(t) = \min(U(t), P) \quad \text{if } z(t) > 0 \quad (1.4)$$
$$= \min(U(t), P) \quad \text{if } z(t) = 0$$

We will find it convenient to equivalently characterize the dual leaky bucket regulator by the three-tuple, (r, Q, P), where Q is the maximum burst size and is given by $Q \triangleq PB_T/(P-r)$.

1.2 Generalized Processor Sharing with Output Regulation

Figure 1:
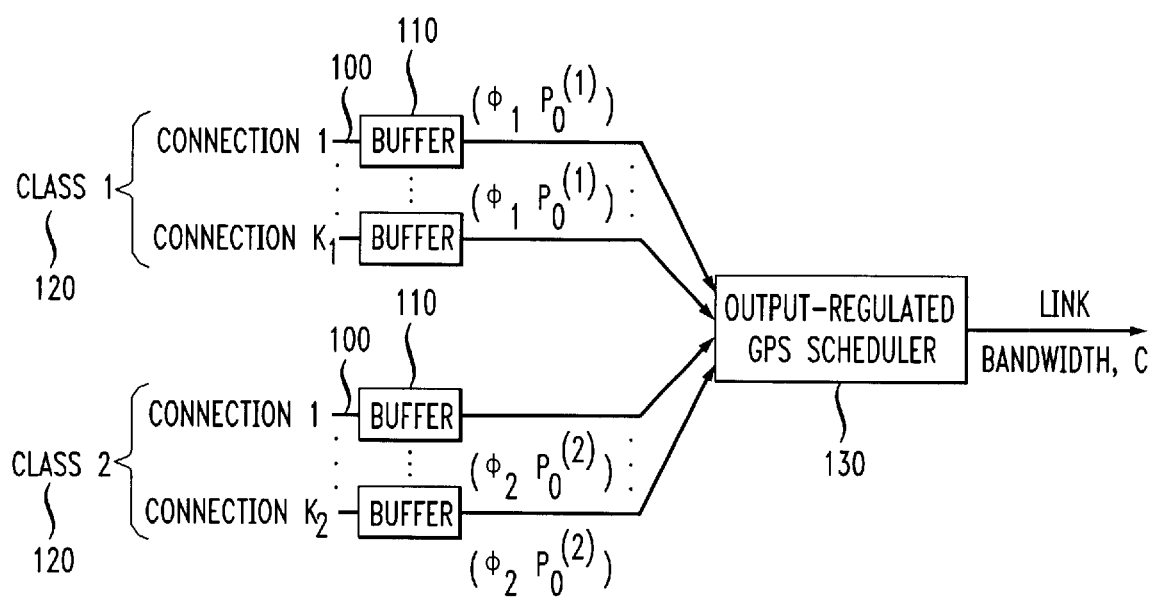
FIG. 1 is a functional diagram of GPS scheduling at a node.

FIG. 1 shows a functional diagram of a generalized processing sharing (GPS) scheduler. The traffic of each connection 100 is dual leaky bucket regulated prior to arrival at the GPS node. In the GPS node, each connection is provided a buffer 110 whose output is subject to peak rate regulation. There are two QoS classes of connections 120 sharing bandwidth C. (This is the total link bandwidth minus the bandwidth allocated to the best effort traffic.) Each connection of class j (j=1,2) has two parameters: $\phi_j$ and $P_o^{(j)}$, which are used to schedule service to the connection. The weight $\phi_j$, in relation to the weights associated with the other connections, determines the connection's share of the bandwidth, which, however, is not allowed to exceed $P_o^{(j)}$. Thus the output rate from the connection buffer (see FIG. 1) does not exceed $P_o^{(j)}$. In our work, the buffer sizes, $\{\phi_j\}$ and $\{P_o^{(j)}\}$ are design parameters to be determined in this invention. The best effort traffic, which is not shown in the FIG. 1, is allocated fixed bandwidth for its exclusive use and is allowed access to the bandwidth unused by the QoS connections. Hence, the QoS classes are oblivious to the best effort traffic. Section 5 deals with issues related to best effort traffic.

The GPS scheduler 130 is work conserving, and in conjunction with the output peak rate regulation, the bandwidth to a connection of class j is at least $$\min\left(P_o^{(j)}, \frac{\phi_j C}{\phi_1 \sum_{i=1}^{K1} \xi_i^{(1)} + \phi_2 \sum_{i=1}^{K2} \xi_i^{(2)}}\right) \quad (j = 1, 2)$$

where $\xi_i^{(j)}$ is an indicator variable for the i th connection of class j, which is 1 if the connection requires bandwidth, and 0 otherwise.

1.3 Chernoff Approximation

The Chernoff large deviations approximation (see, P. Billingsley, *Probability and Measure*, 2nd ed. (Wiley, New York) 1986; N. R. Chaganty and J. Sethuraman, "Strong large deviation and local limit theorems", *Ann. Prob.* 21:(3), 1993, pp. 1671–90; V. V. Petrov, "On the probabilities of large deviations for sums of independent random variables", *Theory Probab. Applicat.* 10, 1965, pp. 287–98) is an effective technique for estimating loss in bufferless multiplexing systems. The procedure given here is based on J. Y. Hui, "Resource allocation for broadband networks", *IEEE J. Select. Areas Commun.* 6, 1988, pp. 1598–1608; and F. P. Kelly, "Effective bandwidths at multi-type queues", *Queueing Systems* 9, 1991, pp. 5–15. Consider $$P_{loss} = Pr(U > C) \quad (1.5)$$

where the total instantaneous demand $$U = \sum_{j=1}^{J} \sum_{k=1}^{K_j} u_{jk},$$

and $\{u_{jk}\}$ are independent random variables and $\{u_{jk}\}_k$ are nonnegative identically distributed for each $j$. Here there are $J$ source classes and $K_j$ sources of class $j$. When $C$ is the nodal bandwidth, $P_{loss}$ is the fraction of time that losses occur. Other performance measures related to $P_{loss}$ are discussed in *Performance Evaluation and Design of Multiservice Networks*, ed. J. W. Roberts, Commission of the European Communities, Final Rep. COST 224 project, 1992.

Assume that the instantaneous loads $u_{jk}$ have moment generating functions $$M_j(s) = E[e^{su_{jk}}](j=1, 2, \ldots, J) \quad (1.6)$$

Also assume the stability condition $$\sum_j K_j E(u_{jk}) < C$$

and that $$\lim_{s \to \infty} \sum_j K_j M'_j(s) / M_j(s) > C,$$

as otherwise there is no loss. Then the Chernoff bound augmented by a lower order refinement (see, V. V. Petrov, "On the probabilities of large deviations for sums of independent random variables", *Theory Probab. Applicat.* 10, 1965, pp. 287–98) gives the following approximation for the scaling $K_j = \gamma_j C$, where $\gamma_j = O(1)$ and $C \to \infty$.
Fact 1

$$P_{loss} = \frac{\exp\{-F(s^*)\}}{s^* \sigma(s^*) \sqrt{2\pi}} [1 + o(1)] \quad (1.7)$$

where $$F(s) = sC - \sum_j K_j \log M_j(s), \quad F(s^*) = \sup_{s \geq 0} F(s),$$

and $\sigma^2(s) = \partial^2 \log E(e^{sU})/\partial s^2$

Later in this disclosure we will encounter the case where $u_{jk}$ are independent on-off random variables which take values 0 and 1 and $E(u_{jk}) = w^{(j)}$, i.e., $$P_r(u_{jk}=1) = 1 - Pr(u_{jk}=0) = w^{(j)} \quad (1.8)$$

Assume that $\Sigma K_j w^{(j)} < C$ and $\Sigma K_j > C$.
Fact 2

The Chernoff approximation for $P_{loss}$ with multiple class is $$P_{loss} \sim \frac{e^{-F(s^*)}}{s^* \sigma(s^*) \sqrt{2\pi}} \quad (1.9)$$

where $s^*$ is the unique positive real solution to the equation $$e^s \sum_j \frac{K_j w^{(j)}}{1 - w^{(j)} + w^{(j)} e^s} = C \quad (1.10)$$

$$F(s) = sC - \sum_j K_j \log\{1 - w^{(j)} + w^{(j)} e^s\} \text{ and} \quad (1.11)$$

$$\sigma^2(s) = e^s \sum_j \frac{K_j w^{(j)}(1 - w^{(j)})}{\{1 - w^{(j)} + w^{(j)} e^s\}^2} \quad (1.12)$$

Of considerable interest is the following explicit form of the Chernoff asymptotic approximation for the further specialization to a single source class. Here we drop the class index $j$.
Fact 3

$$P_{loss} = \frac{e^{-F(s^*)}}{s^* \sigma(s^*) \sqrt{2\pi}} \quad (1.13)$$

$$a = \frac{C}{K},$$

$$s^* = \log\left[\frac{a}{1-a} \cdot \frac{1-w}{w}\right]$$

where $$F(s^*) = K\left[a \log\left(\frac{a}{w}\right) + (1-a)\log\left(\frac{1-a}{1-w}\right)\right] \quad (1.14)$$

and $$\sigma^2(s) = Kw(1-w)e^s/\{1-w+we^s\}^2 \quad (1.15)$$

The numerical results that we report in this invention use the expressions in Facts 2 and 3.

Although we have no specific need for the result, note the results in the multi-class framework concerning distributions of independent random variables which maximize the Chernoff approximation $P_{loss} \sim \exp(-F(s^*))$. See, D. Mitra and J. A. Morrison, "Multiple time scale regulation and worst case processes for ATM network control", in *Proc. 34th Conf. on Decision and Control*, 1995, pp. 353–58. Assume that the random variables $u_{jk}$ are subject to the peak constraint of $e_o^{(j)}$ and their mean is bounded by $r^{(j)}$. The result states that the exponential Chernoff approximation is maximized by on-off random variables which take values 0 and $e_o^{(j)}$, and have mean $r^{(j)}$.

2. Lossless Multiplexing

In this section, we consider the case in which there is a single node and the QoS guarantee is deterministic, i.e., no loss, or violation, is permitted of the delay requirement. The delay bound may depend on the class of the connection. The treatment in the next section on statistical multiplexing expands on the base built here, and the numerical results presented later compare the capacities obtained from lossless and statistical multiplexing. Peak rate regulation of the output of each connection's buffer is ignored in the analysis of this section. The results will determine the value of the peak rate.

2.1 Single Source System

Figure 2:
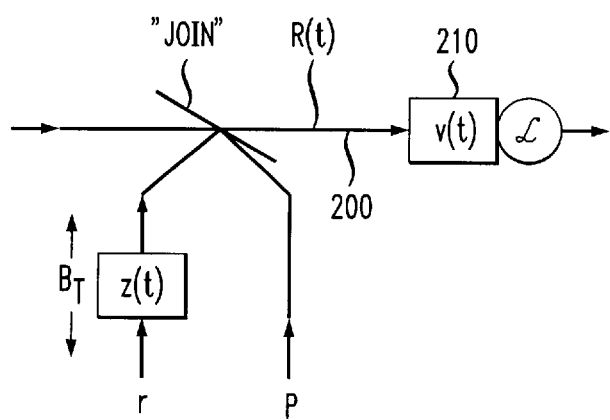
FIG. 2 shows a single source or a single connection system.

We begin by considering a single regulated traffic stream R(t) 200 which feeds a buffer of unlimited capacity and a buffer 210 is serviced by a trunk of capacity, i.e., bandwidth, c(c>r). See FIG. 2 and recall Section 1.1.

The content of the system buffer is denoted by $v(t)$. The main goal of this subsection is to derive a simple expression for the maximum of the system buffer content. For our purposes here, the regulated stream R(t) is such that the total flow in any interval $[t, t+\tau], A_R(t, t+\tau)$, is bounded, and thus $$A_R(t, t+\tau) \leq \min(P\tau, z(t) + r\tau) \forall t, \forall \tau > 0 \tag{2.1}$$

The "min" operation in Eq. (2.1) is performed by the "join" in the schematic of FIG. 2.

Propostion 1

For all t $$v(t) \leq \frac{(P-c)B_T}{(P-r)} \triangleq b \tag{2.2}$$

Figure 3A:
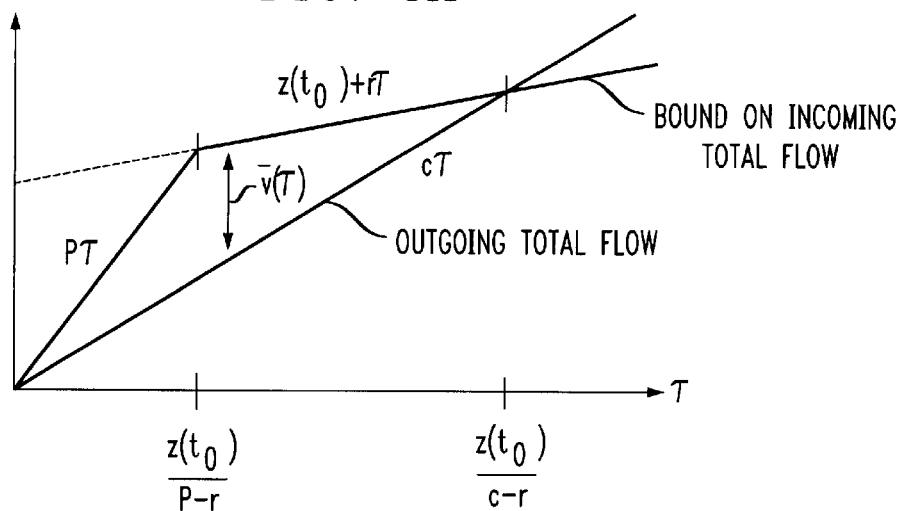
FIGS. 3(a)–(b) show the bound on buffer content during a busy period.
Figure 3B:
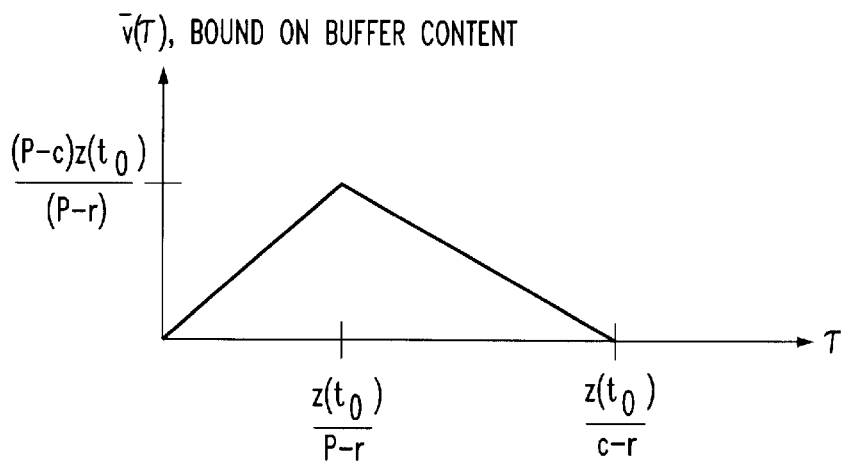

Proof: Clearly the maximum of $v(t)$ occurs during a busy period of the buffer. Let $t_o$ correspond to the onset of a busy period, i.e., $v(t_o)=0$ and $v(t_o+)>0$. As FIG. 3 shows, in the busy period the total flow into the buffer during the interval $[t_o, t_0+\tau]$ is, from Eq. (2.1), bounded by $$\begin{cases} P\tau & 0 \leq \tau \leq z(t_o)/(P-r) \\ z(t_o) + r\tau & z(t_o)/(P-r) \leq \tau \end{cases} \tag{2.3}$$

On the other hand, since by assumption the interval $[t_0, t_0+\tau]$ is contained in the busy period, the total flow out of the buffer is at least $c\tau$. The difference $\bar{v}(\tau)$ is a bound on the buffer content during the buffer's busy period. Hence, for $\tau \geq 0$, $$\bar{v}(\tau) \leq \frac{(P-c)z(t_o)}{(P-r)} \leq \frac{(P-c)B_T}{(P-r)}$$

which completes the proof.

The result in Eq. (2.2) is tight, i.e., the bound is realized by the extremal regulated source process, which we now specify. This rate process turns on when the token buffer is full and transmits at peak rate P, it turns off when the token buffer first becomes empty, and resumes the cycle at the instant the token buffer again becomes full. We denote this extremal process by $R_\Omega(t)$ $$R_\Omega(t) \begin{aligned} &= P & 0 \leq t \leq T_{on} \\ &= 0 & T_{on} < t \leq T_{on} + T_{off} \end{aligned} \tag{2.4}$$

where $T_{on} < B_T/(P-r)$ and $T_{off} = B_T/\tau$. Also let $T=T_{on}+T_{off}$ and the source activity factor $\omega_\Omega = r/P$.

As indicated in Eq. (2.4), the bound on the buffer content is given by b, which may be viewed as a function of the bandwidth variable c, i.e., b=b(c). Note from FIG. 3 that the buffer is non-empty for an interval which is bounded by $D_{on}$, where $$D_{on} T_{on} + b/c \tag{2.5}$$

Similarly, the bandwidth c, when viewed as a resource, is utilized during the same period that the buffer is non-empty. When the input is the extremal regulated source process $R_\Omega(t)$, this period is followed by a period of length $D_{off}$ during which the buffer and bandwidth is not utilized, where $$D_{off} = T_{off} - b/c \tag{2.6}$$

Hence, for this input process the fraction of time that the buffer and bandwidth is utilized is $$\omega = \frac{D_{on}}{D_{on} + D_{off}} = \omega_\Omega + \frac{b}{c} \cdot \frac{1}{T} \tag{2.7}$$

2.2 Multiplexing and GPS Design

We consider lossless multiplexing in the GPS system, the design of weights $(\phi_1, \phi_2)$ and its impact on the admissible and realizable sets. The QoS requirements are that (i) there are no losses, and (ii) the maximum delay is bounded by $D_j$ for class j (j=1,2). We will lead to the specification of the realizable set $\Re_o$, which is the set of sources K=($K_1,K_2$) for which there exists weights such that the QoS requirements are satisfied.

We have seen that, for the single source system, when the bandwidth allocated is c, the buffer content is at most b(c), see Eq. (2.2). Hence the delay is at most b/c and consequently the QoS requirement that the delay be at most D is satisfied if $$b/c \leq D \tag{3.8}$$

Figure 4:
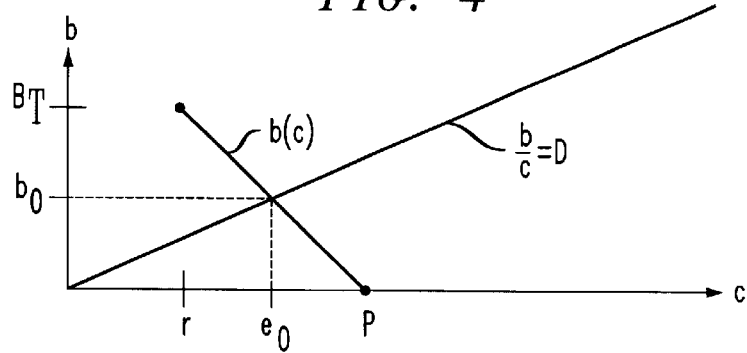
FIG. 4 shows the effective bandwidth $e_o$ and the corresponding buffer $b_o$ for lossless multiplexing.

As indicated in FIG. 4, the smallest value of the bandwidth c which satisfies Eq. (2.2) and Eq. (2.8) is $e_o$, and the corresponding buffer size for which no losses occur is $b_o$. We tacitly assume that $D \leq B_T/r$, since otherwise the selection $(e_o, b_o) = (r, B_T)$ suffices. Hence $$e_0 = \frac{P}{1 + D/T_{on}} \tag{2.9}$$

We call $e_o$ the effective bandwidth for lossless multiplexing (the subscript 0 is a mnemonic for zero loss).

Proceeding to the design of GPS weights, we begin by tagging a source of class 1, say source 1, and we assume that it is active, i.e., its bandwidth is utilized. Hence, the tagged source will satisfy its QoS requirements if it receives bandwidth $e_o^{(1)}$, the effective bandwidth of lossless multiplexing for class 1 sources. The fair share of the tagged source is at least $$\frac{\phi_1 C}{\phi_1 + \phi_1 \sum_{i=1}^{K_1-1} \xi_i^{(1)} + \phi_2 \sum_{i=1}^{K_2} \xi_i^{(2)}} \tag{2.10}$$

Here $K_j$ is the number of sources of class j and $\xi_i^{(j)}$ is an indicator variable for source i of class j that takes value 1 if the source is active and 0 otherwise. Hence the bandwidth demand of the active tagged source is satisfied if $$e_0^{(1)} \le \frac{\phi_1 C}{\phi_1 + \phi_1 \sum_{i=1}^{K_1-1} \xi_i^{(1)} + \phi_2 \sum_{i=1}^{K_2} \xi_i^{(2)}} \qquad (2.11)$$

i.e., $$\phi_1 \sum_{i=1}^{K_1-1} \xi_i^{(1)} + \phi_2 \sum_{i=1}^{K_2} \xi_i^{(2)} \le \phi_1 \left(\frac{C}{e_0^{(1)}} - 1\right) \qquad (2.12)$$

By an analogous argument for a tagged active source of class 2, $$\phi_1 \sum_{i=1}^{K_1} \xi_i^{(1)} + \phi_2 \sum_{i=1}^{K_2-1} \xi_i^{(2)} \le \phi_2 \left(\frac{C}{e_0^{(2)}} - 1\right) \qquad (2.13)$$

Both of the above conditions have to hold for QoS to be satisfied.

We return to these two conditions in the next section when we consider statistical multiplexing. Here, where the topic is lossless multiplexing, we consider the rare but still possible case where the bursts of all sources are coincident, i.e., active at a common point in time. In this worst-case scenario $\xi_i^{(j)}=1$ for all j and i in Eq. (2.12) and Eq.(2.13). This gives $$K_1 \phi_1 + K_2 \phi_2 \le C \left[\min\left(\frac{\phi_1}{e_0^{(1)}}, \frac{\phi_2}{e_0^{(2)}}\right)\right] \qquad (2.14)$$

The selection of weights $$\phi_1 = e_o^{(1)}, \phi_2 = e_o^{(2)} \qquad (2.15)$$

realizes the following admissible set of sources K, $$K_1 e_o^{(1)} + K_2 e_o^{(2)} \le C \qquad (2.16)$$

which we denote by $\mathcal{A}_o$. It is easy to verify that this set cannot be improved upon. Hence the realizable set $\mathcal{R}_o$ coincides with admissible set $\mathcal{A}_o$ obtained from the weights in Eq. (2.15), a fortuitous fact.

Recall that the above derivation has relied on sufficiency for satisfying QoS, as in Eq. (2.10) and Eq. (2.11). Thus the possibility exists that the realizable set may be larger than $\mathcal{R}_o$ for certain, benign sources. Now recall that to satisfy QoS, the extremal regulated source process defined in Section 2.1 has a bandwidth demand process which is on-off and takes value $e_o^{(j)}$, j=1,2, while on. For this process the admissible set in Eq. (2.16) is maximal, as is easy to verify, and in this sense the characterization of the realizable set in Eq. (2.16) is tight for lossless multiplexing.

Note from Eq. (2.15) and Eq. (2.16) that the bandwidth allocation to class j sources is $e_o^{(j)}$, which is typically greater than the usual allocation of the mean rate $r^{(j)}$. This, of course, is because of the delay requirement in the QoS specifications, which is not usually considered.

Now if we consider reinstatement of peak rate regulation of the output of each connection's buffer, a natural choice for the peak rate is $e_o^{(j)}$, for class j connections, since it is the smallest value which will not modify the above analysis and the QoS.

3. Statistical Multiplexing and GPS Design: Single Node Analysis

Here we adopt the statistical point of view and allow small probabilities that the delay requirements are not satisfied. We call these the loss probabilities. This terminology, besides being ingrained, also reflects the scenario where buffers are sized in conjunction with bandwidth allocations, and insufficient bandwidth availability is responsible for both buffer overflow and violation of the delay requirement. The QoS specifications for class j are $D_j$ and $L_j$, where $D_j$ is, as before, the delay bound and $L_j$ is the loss probability. In the statistical multiplexing framework the design of GPS weights, while obviously complex, has the simple goal of allocating resources to just match the resources required to satisfy QoS requirements. A final overriding concern is that the design relies on only a very small set of weights, since frequent switching of weights is not feasible in operations and also leads to violations of the tacit assumption in the analysis that steady state exists.

It will become apparent that the analysis of this section applies to output regulated GPS provided only that the peak rate of the output of each connection's buffer is not less than $e_o^{(j)}$, for class j connections. Our design ensures this, and as a consequence output regulation is transparent to the analysis and hence it is ignored in this section.

3.1 Statistical QoS

We consider the extremal regulated source process, for which it was shown in Section 2 that the bandwidth demand to satisfy QoS is an on-off process taking values $e_o^{(j)}$ and 0. Denote this process by $u_{ji}(t)$ for source i of class j. From the assumption of statistical independence of sources $$u_{ji}(t) = u_j(t + \theta_{ji}) \qquad (3.1)$$

where $u_{ji}(t)$ is a fixed, periodic on-off function with period $T_j$, which takes values $e_o^{(j)}$ and 0 for fractions $\omega^{(j)}$ and $(1-\omega^{(j)})$, respectively (see Eq. 2.7), where $\omega^{(j)} = r^{(j)}/e_o^{(j)}$; the phases $\theta_{ji}$ are independent random variables uniformly distributed over the interval $T_j$.

As a consequence of the above model the activity indicators $\xi_i^{(j)}$ are independent, binomial random variables, $$Pr(\xi_i^{(j)}=1) = 1 - Pr(\xi_i^{(j)}=0) = \omega_i^{(j)} \qquad (3.2)$$

We return to the QoS requirements in Eq. (2.12) and Eq. (2.13) and obtain their statistical counterparts:

$$Pr\left[\phi_1 \sum_{i=1}^{K_1-1} \xi_i^{(1)} + \phi_2 \sum_{i=1}^{K_2} \xi_i^{(2)} > \phi_1(C/e_0^{(1)} - 1)\right] \le L_1 \qquad (3.3)$$

$$Pr\left[\phi_1 \sum_{i=1}^{K_1} \xi_i^{(1)} + \phi_2 \sum_{i=1}^{K_2-1} \xi_i^{(2)} > \phi_2(C/e_0^{(2)} - 1)\right] \le L_2 \qquad (3.4)$$

Here $L_1$ and $L_2$ are small QoS parameters. In Eq. (3.3), which is concerned with QoS for class 1, it is assumed that $K_1 \ge 1$. Similarly, Eq. (3.4) is concerned with QoS for class 2 and hence $K_2 \ge 1$. Importantly, both conditions have to be simultaneously satisfied. Also note that the approach leading to Eq. (3.3) and Eq. (3.4) is based on the assumption made in Eq. (2.12) and Eq. (2.13) that the tagged source is active. There are alternative measures which may be readily incorporated, for instance where the probabilistic behavior of the tagged source's activity is included. We do not expect such a modification to make a significant difference to the admissible regions.

3.2 Maximum Admissible Sources, or Corner Points

Let $\overline{K}_1^{(1)}$ and $\overline{K}_2^{(2)}$ be called "pinned corner points" for class 1 and 2, respectively, where $\overline{K}_j^{(j)}$ is the maximum number of sources of class j such that QoS of class j is satisfied when there are no sources of the complementary class. That is, from Eq. (4.3), $$Pr\left[\sum_{i=1}^{K_1^{(1)}-1} \xi_i^{(1)} > (C/e_0^{(1)} - 1)\right] \leq L_1 < Pr\left[\sum_{i=1}^{K_1^{(1)}} \xi_i^{(1)} > (C/e_0^{(1)} - 1)\right] \quad (3.5)$$

We adopt the following notation to abbreviate Eq. (3.5):

$$Pr\left[\sum_{i=1}^{K_1^{(1)}-1} \xi_i^{(1)} > (C/e_0^{(1)} - 1)\right] \leq L_1 \quad (3.6)$$

Similarly, from Eq. (3.4), $$Pr\left[\sum_{i=1}^{K_2^{(2)}-1} \xi_i^{(1)} > (C/e_0^{(2)} - 1)\right] \leq L_2 \quad (3.7)$$

The reason we call these corner points pinned is because they do not depend on the design variables $\phi_1$ and $\phi_2$.

Obviously the design only depends on the ratio of weights, which we denote by $\phi \triangleq \phi_1/\phi_2$. Let $\overline{K}_2^{(1)}(\phi)$ and $\overline{K}_1^{(2)}(\phi)$ be "design corner points" for class 1 and 2, respectively, where $\overline{K}_i^{(j)}(\phi)$ is the maximum number of class i sources such that, for fixed $\phi$, with a single class j ($j \neq i$) source, i.e. $K_j=1$, this source, while active, receives resources to satisfy its QoS. Hence, from Eq. (3.3), $$Pr\left[\sum_{i=1}^{\overline{K}_2^{(1)}(\phi)} \xi_i^{(2)} > \phi(C/e_0^{(1)} - 1)\right] \leq L_1 \quad (3.8)$$

and, from Eq. (4-4), $$Pr\left[\sum_{i=1}^{\overline{K}_1^{(2)}(\phi)} \xi_i^{(1)} > \frac{1}{\phi}(C/e_0^{(2)} - 1)\right] \leq L_2 \quad (3.9)$$

Note that the expressions to the left of Eqs. (3.6)–(3.9) are basically simple since only single classes are involved and they may be evaluated most rapidly and conveniently by using the single class Chernoff approximation in Fact 3, Section 1.3. Note too that in our notational system for the corner points the superscript refers to the class whose QoS is under consideration, and the subscript refers to the class for which we seek the maximum number of sources.

The following monotonicity and range properties of $\overline{K}_2^{(1)}(\phi)$ and $\overline{K}_1^{(2)}(\phi)$, while self-evident from Eq. (3.8) and (3.9), are of crucial importance. As $\phi$ ranges from small to large values, $\overline{K}_2^{(1)}(\phi)$ is monotonic, non-decreasing and $\overline{K}_1^{(2)}(\phi)$ is monotonic, non-increasing. Also, from Eq. (3.8) as $\phi \to \infty$, $\overline{K}_2^{(1)}(\phi) \to \infty$ and as $\phi \to 0$, $\overline{K}_2^{(1)}(\phi) \to 0$. Similarly, from Eq. (3.9), $\overline{K}_1^{(2)}(\phi)$ can be made as large and as small by making $\phi$ sufficiently small and large, respectively. In summary, we have for the design corner points.

Proposition 2
  (i) $\overline{K}_2^{(1)}(\phi)$ is monotonic, non-decreasing in $\phi$ with range $[0, \infty]$.
  (ii) $\overline{K}_1^{(2)}(\phi)$ is monotonic, non-increasing in $\phi$ with range $[0, \infty]$.

The above behavior appears at first to be counter-intuitive. On further reflection it is understandable that as $\phi$ increases, $\overline{K}_2^{(1)}(\phi)$ also increases, since increasing $\phi$, while reducing the relative weight of each class 2 source, does increase the priority and isolation accorded to the single class 1 source, and hence an increased number of class 2 sources is consistent with preservation of QoS of the single class 1 source. When $\phi$ is small and decreasing, the number of class 2 sources needs to be increasingly constrained to prevent bandwidth starvation for the single class 1 source, hence $\overline{K}_2^{(1)}(\phi)$ approaches 0.

3.3 Critical Weights

We introduce two special values of the weight $\phi$, $\phi_c^{(1)}$ and $\phi_c^{(2)}$ which we call critical weights, that will play important roles in the subsequent development. The critical weight $\phi_c^{(j)}$ is that value of $\phi$ for which the QoS of a single active class j source is satisfied when the number of sources of the complementary class $j_c$ is $\overline{K}_{j_c}^{(j_c)}$, and there is only one source of class j. For example, $\phi_c^{(1)}$ is obtained from the condition $$\overline{K}_2^{(1)}(\phi_c^{(1)}) = \overline{K}_2^{(2)} \quad (3.10)$$

where it is assumed that has been obtained previously. Equivalently $\phi_c^{(1)}$ may be obtained from Eq. (3.8) thus, $$Pr\left[\sum_{i=1}^{\overline{K}_2^{(2)}} \xi_i^{(2)} > \phi_c^{(1)}(C/e_0^{(1)} - 1)\right] \leq L_1 \quad (3.11)$$

In general, the defining relation for $\phi_c^{(j)}$ is $$\overline{K}_{j_c}^{(j)}(\phi_c^{(j)}) = \overline{K}_{j_c}^{(j_c)} \quad (3.12)$$

Using the Chernoff approximation for a single class given in Fact 3, Section 1.3, it is straightforward to calculate the critical weights from Eq. (3.11).

The existence of the critical weights follows from Proposition 2. In the case of $\phi_c^{(1)}$, for instance, we know from Eq. (3.8) and Proposition 2 that as $\phi$ is increased from a small value, $\overline{K}_2^{(1)}(\phi)$ crosses the given level $\overline{K}_2^{(2)}$ from below and the value of $\phi$ at the crossing is $\phi_c^{(1)}$.

Note from the monotonicity properties in Proposition 2 that, if $\phi \geq \phi_c^{(1)}$ then $\overline{K}_2^{(1)} \geq \overline{K}_2^{(2)}$ and for $\phi$ sufficiently large the latter inequality is strict. Similarly, if $\phi \geq \phi_c^{(2)}$ then $\overline{K}_1^{(2)}(\phi) \leq \overline{K}_1^{(1)}$ and for $\phi$ sufficiently small the latter inequality is strict.

3.4 Admissible and Realizable Sets

These important sets highlight the role of the weights. Let $\mathcal{A}^{(j)}(\phi)$ denote the set of sources K which are admissible from the perspective of QoS for class j sources for given $\phi$. That is, $$\mathcal{A}^{(1)}(\phi) \triangleq \{K : (3.3), \text{ i.e., } QoS \text{ for class 1, is satisfied, given } \phi\} \quad (3.13)$$

$$\mathcal{A}^{(2)}(\phi) \triangleq \{K : (3.4), \text{ i.e., } QoS \text{ for class 2, is satisfied, given } \phi\} \quad (3.14)$$

The admissible set/is defined thus:

$$\mathcal{A}(\phi)^L \triangleq \mathcal{A}^{(1)}(\phi) \cap \mathcal{A}^{(2)}(\phi) = \{K : (3.3) \text{ and } (3.4), \quad (3.15)$$
$$\text{i.e., } QoS \text{ for classes 1 and 2 are satisfied, given } \phi\}$$

Finally, the realizable set $\mathfrak{R}$ is defined thus:

$$\mathfrak{R} \triangleq \bigcup_\phi \mathcal{A}(\phi) = \{K : \exists \phi \text{ such that } K \in \mathcal{A}(\phi)\} \quad (3.16)$$

We let the boundary of each of the above sets be denoted by $\partial$, so that $\partial \mathcal{A}^{(1)}(\phi)$ denotes the boundary of $\mathcal{A}^{(1)}(\phi)$.

The following result gives a procedure for computing the realizable set $\mathfrak{R}$.

Propositon 3

The boundary $\partial \mathfrak{R}$ parameterized by $K_2$ is obtained by solving for $K_1$ and $\phi$ from Eq. (3.3) and Eq. (3.4) in which the outer inequalities are replaced by equalities.

The proof is simple and by contradiction. Suppose for fixed $K_2$, $(K_1, \phi)$ are obtained by the above procedure, and $(K_1', \phi')$ are such that the equality holds in Eq. (3.3) and the strict inequality holds in Eq. (3.4), and also $K_1' > K_1$. By comparing the two expressions corresponding to Eq. (3.4) it may be inferred that $\phi' < \phi$. This ordering when used in the two equations corresponding to Eq. (3.3) immediately gives a contradiction. To complete the proof we need to also consider the possibility that $(K_1', \phi')$ are such that the strict inequality and equality hold in Eqs. (3.3) and (3.4), respectively. A contradiction by a similar argument follows.

3.5 Linear Approximations to the Admissible Sets

The boundaries of the admissible regions $\mathcal{A}(\phi)$ defined above are typically nonlinear. However, our experience has been that typically good approximations are provided by simplexes, i.e., regions with boundaries composed of linear segments. Our design methodology is based on linear approximations of the admissible regions. Such approximations are completely determined by a small number (2–4) of corner points. We let $\mathcal{L}^{(j)}\phi$ be the linear approximation to $\mathcal{A}^{(1)}(\phi)(j=1,2)$ and $\mathcal{L}(\phi)$ be the linear approximation to $\mathcal{A}(\phi)$. Also $\tilde{\mathfrak{R}}$ is the approximation to the realizable set $\mathfrak{R}$ obtained from the linear approximations to the admissible set. However, $\tilde{\mathfrak{R}}$ itself is not a simplex in general. In each of two cases to be described below, linear approximations to the realizable sets are also developed, but we defer further descriptions of these entities.

We construct the linear approximation $\mathcal{L}^{(j)}(\phi)$ by making its corner points be equal to the corner points of $\mathcal{A}^{(j)}(\phi)$, and then joining these points by linear segments. For instance, the boundaries of $\mathcal{L}^{(1)}(\phi)$ and $\mathcal{A}^{(1)}(\phi)$ have in common the corner points $(\overline{K}_1^{(1)}, 0)$, $(1, \overline{K}_2^{(1)}(\phi))$, and $(0, \infty)$. Similarly, the boundaries of $\mathcal{L}^{(2)}(\phi)$ and $\mathcal{A}^{(2)}(\phi)$ have points $(0, \overline{K}_2^{(2)})$, $(\overline{K}_1^{(2)}(\phi), 1)$, and $(\infty, 0)$. Note that in the figures we do not attempt to represent $(0, \infty)$ and $(\infty, 0)$. The boundary of $\mathcal{L}^{(j)}(\phi)$, $\partial \mathcal{L}^{(j)}(\phi)$ is composed of two linear segments connecting the three aforementioned corner points, although only one segment in the figures. Finally, $$\mathcal{L}(\phi) = \mathcal{L}^{(1)}(\phi) \cap \mathcal{L}^{(2)}(\phi) \quad (3.17)$$

The approximation to the realizable set based on the linear approximations to the admissible sets is $\tilde{\mathfrak{R}}$, where $$\tilde{\mathfrak{R}}_{\mathcal{L}} = \bigcup_\phi \mathcal{L}(\phi) = \{K : \exists \phi \text{ such that } K \in \mathcal{L}(\phi)\} \quad (3.18)$$

Figure 5:
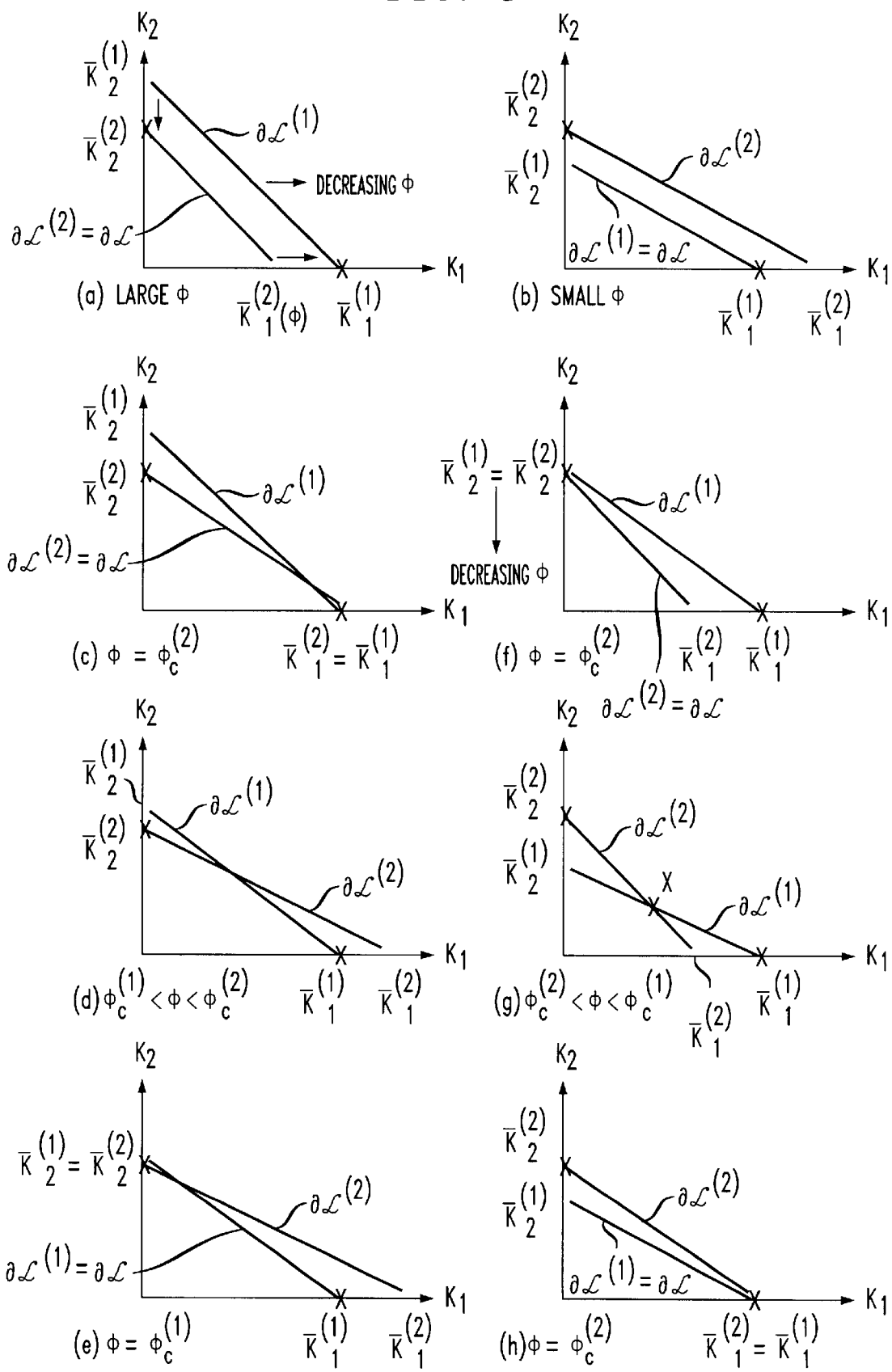
FIGS. 5(a)–(h) show the influence of the weight $\phi$ on the admissible regions; (c)–(e) refer to the effectively homogeneous case and (f)–(h) refer to the effectively non-homogeneous case.

The reader may examine sketches of the linear approximations in FIG. 5.

3.6 Qualitative Discussion of the Influence of the Weights on the Admissible Set When $\phi$ is large, i.e., the relative weight given to class 1 sources is large, an examination of Eq. (3.9) shows that $\overline{K}_1^{(2)}(\phi)$ is small. That is, in the presence of a single active class 2 source and with the QoS of this source at issue, the number of admissible class 1 sources is small, somewhat paradoxically. Moreover, this quantity increases as $\phi$ decreases. See FIG. 5.

From the perspective of QoS for the class 2 source, the system is in effect hard-partitioned with only a small allocation of aggregate bandwidth to class 1 sources. That is, to satisfy this QoS, the unbalanced choice of weights has to be compensated by an oppositely unbalanced allocation of bandwidth. Hence, any expectation that very large relative weight given to class 1 sources will allow large numbers of admissible class 1 sources is thwarted by considerations of QoS for class 2.

When $\phi$ is large, decreasing $\phi$, i.e., decreasing the relative weight given to class 1 sources, has the effect of increasing the number of admissible class 1 sources when there is an active single class 2 source. The explanation is contained in the above discussion. First observe in FIG. 5(a), that for $\phi$ large the boundary of the admissible region contains the points $(\overline{K}_1^{(2)}(\phi), 1)$ and $(\overline{K}_1^{(1)}, 0)$, and also $\overline{K}_1^{(2)}(\phi) << \overline{K}_1^{(1)}$. Hence the number of admissible class 1 sources in the presence of a single active class 2 source is $\overline{K}_1^{(2)}(\phi)$. As is clear from Eq. (3.9) and the above discussion, $\overline{K}_1^{(2)}(\phi)$ increases as $\phi$ decreases.

Note that in this case the misallocation of weights leads to a small number of class 1 sources benefitting by receiving QoS well in excess of requirements. Hence excessively large $\phi$ simultaneously inhibits sharing as well as misallocates resources.

We conclude by drawing attention to the feature in FIG. 5(a), which follows from the symmetrical implication on $\overline{K}_2^{(1)}(\phi)$ of the argument given above. From the perspective of QoS of a single class 1 source, the number of admissible class 2 sources is large, for large $\phi$, see Eq. (3.8). The bandwidth partitioning is such that the aggregate allocation to class 2 is large. Hence $\overline{K}_2^{(1)}(\phi)$ is large, and the excess over $\overline{K}_2^{(2)}$ which QoS for class 2 dictates, is a measure of the inefficiency due to misallocation of weights.

3.7 The "Effectively Homogeneous" Case

The justification for the above label will become apparent later and it will also become clear that this is a benign case from the design perspective. The case is depicted in FIGS. 5(c)–(e), and it arises if any of the following conditions hold.

Proposition 4

The following conditions are equivalent $$(i) \quad \phi_c^{(1)} \leq \phi_c^{(2)} \quad (3.19)$$

$$(ii) \text{ For some } \phi, \overline{K}_1^{(2)}(\phi) = \overline{K}_1^{(1)} \text{ and } \overline{K}_2^{(2)} \leq \tilde{K}_2^{(1)}(\phi) \quad (3.20)$$

$$(iii) \text{ For some } \phi, \overline{K}_2^{(1)}(\phi) = \overline{K}_2^{(2)} \text{ and } \overline{K}_1^{(1)} \leq \tilde{K}_1^{(2)}(\phi) \quad (3.21)$$

Proof: Note that in Eq. (3.20), $\phi = \phi_c^{(2)}$ and in Eq. (3.21), $\phi = \phi_c^{(1)}$. This follows from Eq. (3.12). If Eq. (3.20) holds then $\overline{K}_2^{(2)} \leq \overline{K}_2^{(1)}(\phi_c^{(2)})$, and since $\overline{K}_2^{(1)}(\phi)$ is monotonic, non-increasing with decreasing $\phi$, as stated in Proposition 2, Eq. (3.19) follows. If Eq. (3.19) holds then from the above property of $\overline{K}_2^{(1)}(\phi)$ and the monotonic non-increasing behavior of $\overline{K}_1^{(2)}(\phi)$ with increasing $\phi$, Eq. (3.21) follows. By a similar argument, Eq. (3.20) follows from Eq. (3.21).

From the key monotonicity properties of $\overline{K}_2^{(1)}(\phi)$ and $\overline{K}_1^{(2)}(\phi)$, which have been summarized in Proposition 2, the important fact follows that the linear approximation to the admissible set $\mathcal{L}(\phi)$ for $\phi<\phi_c^{(2)}$ is dominated by $\mathcal{L}(\phi_c^{(2)})$. That is, as shown in FIGS. 5(a) and (c), $$\mathcal{L}(\phi) \subseteq \mathcal{L}(\phi_c^{(2)}) \text{ for all } \phi > \phi_c^{(2)} \qquad (3.22)$$

Similarly as shown in FIGS. 5(b) and (c), we have, $$\mathcal{L}(\phi) \subseteq \mathcal{L}(\phi_c^{(1)}) \text{ for all } \phi < \phi_c^{(1)} \qquad (3.23)$$

Hence we have,
Proposition 5

To maximize the linear approximation to the admissible set, it is disadvantageous to select $\phi$ outside the interval $[\phi_c^{(1)}, \phi_c^{(2)}]$ in the effectively homogeneous case.

Next observe that in this case, for all $\phi$ in the interval $[\phi_c^{(1)}, \phi_c^{(2)}]$, the boundaries of $\mathcal{A}(\phi)$ and $\mathcal{L}(\phi)$ have the important and desirable property of containing the extreme points $(\overline{K}_1^{(1)}, 0)$ and $(0, \overline{K}_2^{(2)})$. Now let $\mathcal{L}_H$ denote the triangular region with the origin $(0,0)$ and these extreme points as vertices. From the construction of $\mathcal{L}(\phi)$ for $\phi \in [\phi_c^{(1)}, \phi_c^{(2)}]$ it should be clear that $\mathcal{L}_H$ is a conservative, but generally close, approximation to the union of $\mathcal{L}(\phi)$. That is $$\mathcal{L}_H \subseteq \bigcup_{\phi \in [\phi_c^{(1)}, \phi_c^{(2)}]} \mathcal{L}(\phi) \qquad (3.24)$$

From Proposition 5 the right hand set is $\mathfrak{R}_I$. Hence, $\mathcal{L}_H$ is a conservative approximation to $\mathfrak{R}_I$.

In summary, the set $\mathcal{L}_H$ has the important property of containing the extreme points $(\overline{K}_1^{(1)}, 0)$ and $(0, \overline{K}_2^{(2)})$ and, since it is a triangle, it is simple, and also a conservative approximation to the realizable set in the effectively homogeneous case.

3.8 The "Effectively Non-Homogeneous" Case

This case arises when $$\phi_c^{(2)} \leq \phi_c^{(1)} \qquad (3.25)$$

The behavior of the admissible set for various values of $\phi$ in this case is depicted in FIGS. 5(f)–5(h). It follows from Proposition 4 that in this case, $$\overline{K}_1^{(2)}(\phi) = \overline{K}_1^{(1)} \rightarrow \tilde{K}_2^{(2)} > \tilde{K}_2^{(1)}(\phi) \qquad (3.26)$$

and $$\overline{K}_2^{(1)}(\phi) = \overline{K}_2^{(2)} \rightarrow \tilde{K}_1^{(1)} > \tilde{K}_1^{(2)}(\phi) \qquad (3.27)$$

One implication of these observations is that, unlike the effectively homogeneous case, the triangular region $\mathcal{L}_H$ cannot be realized by any fixed $\phi$ and, also, not even by a range of $\phi$. This is a handicap which is addressed later when design procedures are considered.

Observe a similarity with the effectively homogeneous case in that it is also disadvantageous here to select $\phi$ outside the interval $[\phi_c^{(2)}, \phi_c^{(1)}]$. This is because $$\mathcal{L}(\phi) \subseteq \mathcal{L}(\phi_c^{(1)}) \text{ for all } \phi > \phi_c^{(1)} \qquad (3.28)$$

and $$\mathcal{L}(\phi) \subseteq \mathcal{L}(\phi_c^{(2)}) \text{ for all } \phi > \phi_c^{(2)} \qquad (3.29)$$

from the monotonicity properties in Proposition 2.

Next, we give for the benefit of the reader the corner points of the simplex $\mathcal{L}(\phi)$ for $\phi \in [\phi_c^{(2)}, \phi_c^{(1)}]$. See FIG. 5(g) for a sketch. These points are, $(0, \overline{K}_2^{(2)})$, $(1, \overline{K}_2^{(1)}(\phi))$, $(\overline{K}_1^{(2)}(\phi), 1)$ and $(\overline{K}_1^{(1)}, 0)$. At the two extreme points of the interval for $\phi$, i.e. at $\phi = \phi_c^{(2)}$ and $\phi = \phi_c^{(1)}$, the above four corner points reduce to three.

We define now a set $\mathcal{L}_{NH}$ which plays a role in the effectively non-homogeneous case comparable to $\mathcal{L}_H$ in the effectively homogeneous case.

$$\mathcal{L}_{NH} \triangleq \mathcal{L}(\phi_c^{(1)}) \cup \mathcal{L}(\phi_c^{(2)}) \qquad (3.30)$$

Figure 6:
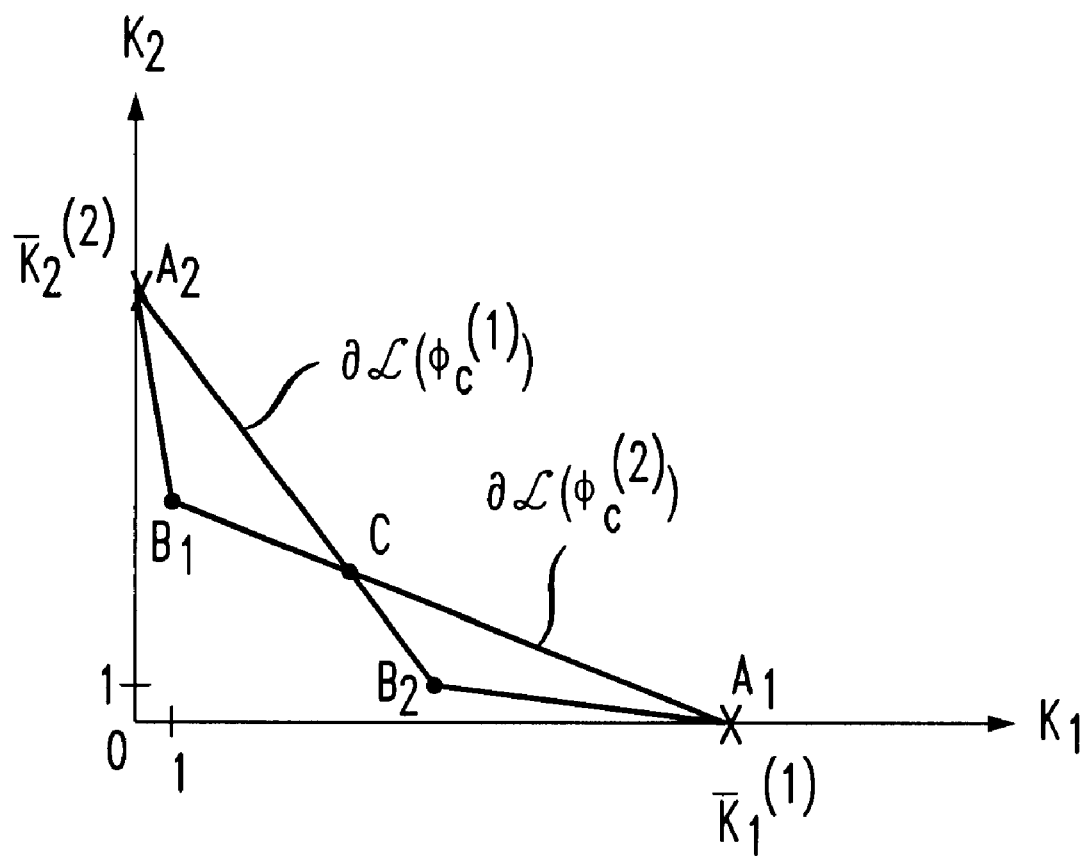
FIG. 6 shows the region $\mathscr{A}_{NH}$ in the effectively non-homogeneous case.

In FIG. 6, this region is the simplex with corner points 0, $A_2$, C and $A_1$. Note that $\mathcal{L}_{NH}$ is a conservative approximation to the realizable set $\mathfrak{R}_I$, i.e., $\mathcal{L}_{NH} \subseteq \mathfrak{R}_I$. An intuitive appreciation of the difference between $\mathcal{L}_{NH}$ and $\mathfrak{R}_I$ may be obtained by superimposing on FIG. 6 the locus of points $X(\phi)$, $\phi_c^{(2)} \leq \phi \leq \phi_c^{(1)}$, where $X(\phi)$, shown in FIG. 5(g), is the point of intersection of $\partial \mathcal{L}^{(1)}(\phi)$ and $\partial \mathcal{L}^{(2)}(\phi)$.

3.9 Proposed Design Procedures

The goal of the design procedures which we propose is to realize, by simple techniques for selecting $\phi$, the set $\mathcal{L}_H$ in the effectively homogeneous case and the set $\mathcal{L}_{NH}$ in the effectively non-homogeneous case. These sets are approximations to the realizable set $\mathfrak{R}$. Our experience has been that $\mathcal{L}_H$ more closely approximates the realizable set than $\mathcal{L}_{NH}$. However even in the latter case the gap between $\mathfrak{R}$ and $\mathcal{L}_{NH}$ is necessarily small and restricted to the interior since the extremal corner points $(\overline{K}_1^{(1)}, 0)$ and $(0, \overline{K}_2^{(2)})$ are common to both sets.

In the effectively homogeneous case the design procedure is straightforward since any fixed $\phi$ in the interval $[\phi_c^{(1)}, \phi_c^{(2)}]$ will give $\mathcal{L}_H$ as its admissible set. A refinement to this procedure is to select $\phi = (\phi_c^{(1)} + \phi_c^{(2)})/2$, which, because of the convexity of $\mathcal{L}(\phi)$, see FIG. 5(d), will yield an admissible set that dominates $\mathcal{L}_H$ and captures most of the gap between $\mathcal{L}_H$ and $\mathfrak{R}$.

Clearly the design procedure is more complicated for the effectively non-homogeneous case since no single $\phi$ will realize all of $\mathcal{L}_{NH}$. Our procedure in this case is to realize $\mathcal{L}_{NH}$ with only two values of $\phi$, namely, $\phi_c^{(1)}$ and $\phi_c^{(2)}$. Say the desired operating point $(K_1, K_2)$ is in the simplex in FIG. 6 with corner points 0, $A_2$, $B_2$, and $A_1$, which we denote by $S(0, A_2, B_1, A_1)$. In this case we use $\phi = \phi_c^{(2)}$. Now suppose that the desired operating point moves into the triangular region $S(A_2, B_1, C)$. We propose switching $\phi$ to $\phi_c^{(1)}$. Alternatively we may realize $S(0, A_1, B_2, A_2)$ by $\phi = \phi_c^{(1)}$ and realize the complementary $S(A_1, B_2, C)$ by $\phi = \phi_c^{(2)}$.

Besides the fact that two, rather than one, weights are required in the design procedure to handle the non-homogeneity, another difference is that the bulk of the gap between $\mathfrak{R}$ and $\mathcal{L}_{NH}$ cannot be captured by any simple strategy, i.e., a large number of values of $\phi$ with correspondingly large number of switching of weights is necessary. This is impractical, and, moreover, as has been observed above, not worth the effort since the gap cannot be substantial.

4. Numerical Results

The investigations reported in this section numerically illustrate the mathematical results of prior sections on statistical multiplexing, GPS design and call admission control.

Specifically, the set of figures address the following issues: (i) the advantage of exploiting statistical multiplexing in GPS design in terms of capacity gain and comparison with traditional designs which are based on deterministic QoS guarantees; (ii) the admissible region as a function of GPS weights; (iii) optimum design of weights and the realizable admissible region; (iv) application to voice and data support.

In each of the three cases we consider there are two QoS source classes sharing a total bandwidth of 45 Mbps (this is the link bandwidth minus the bandwidth allocated to the best effort traffic). Table 4.1 gives the dual leaky bucket and QoS parameters associated with each class in each case, as well as the lossless effective bandwidth $e_o^{(\cdot)}$.

TABLE 4.1

Figure 7:
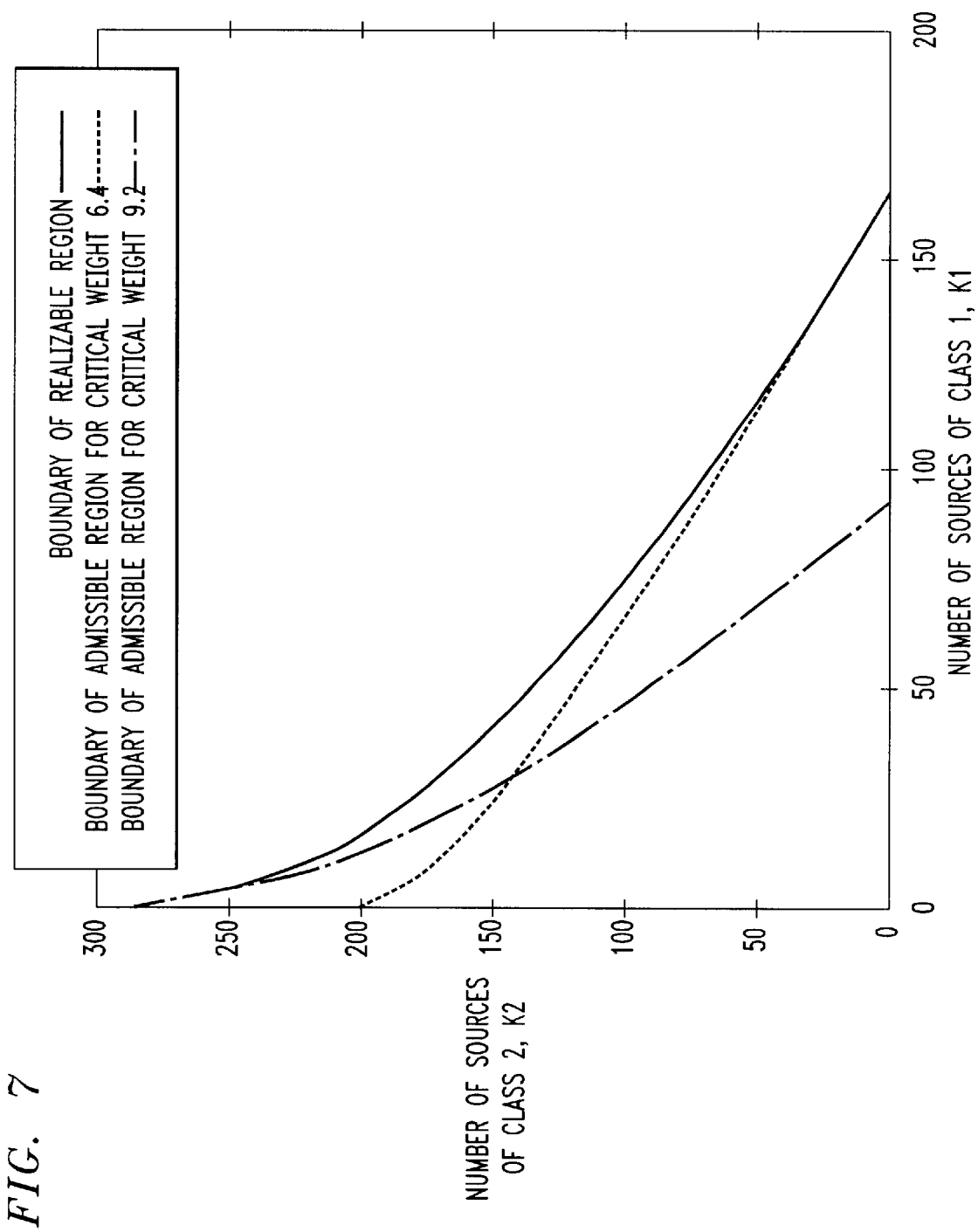
FIG. 7 shows the admissible region corresponding to the critical weights for the two classes of connections and the realizable region for Case 1.
Figure 8:
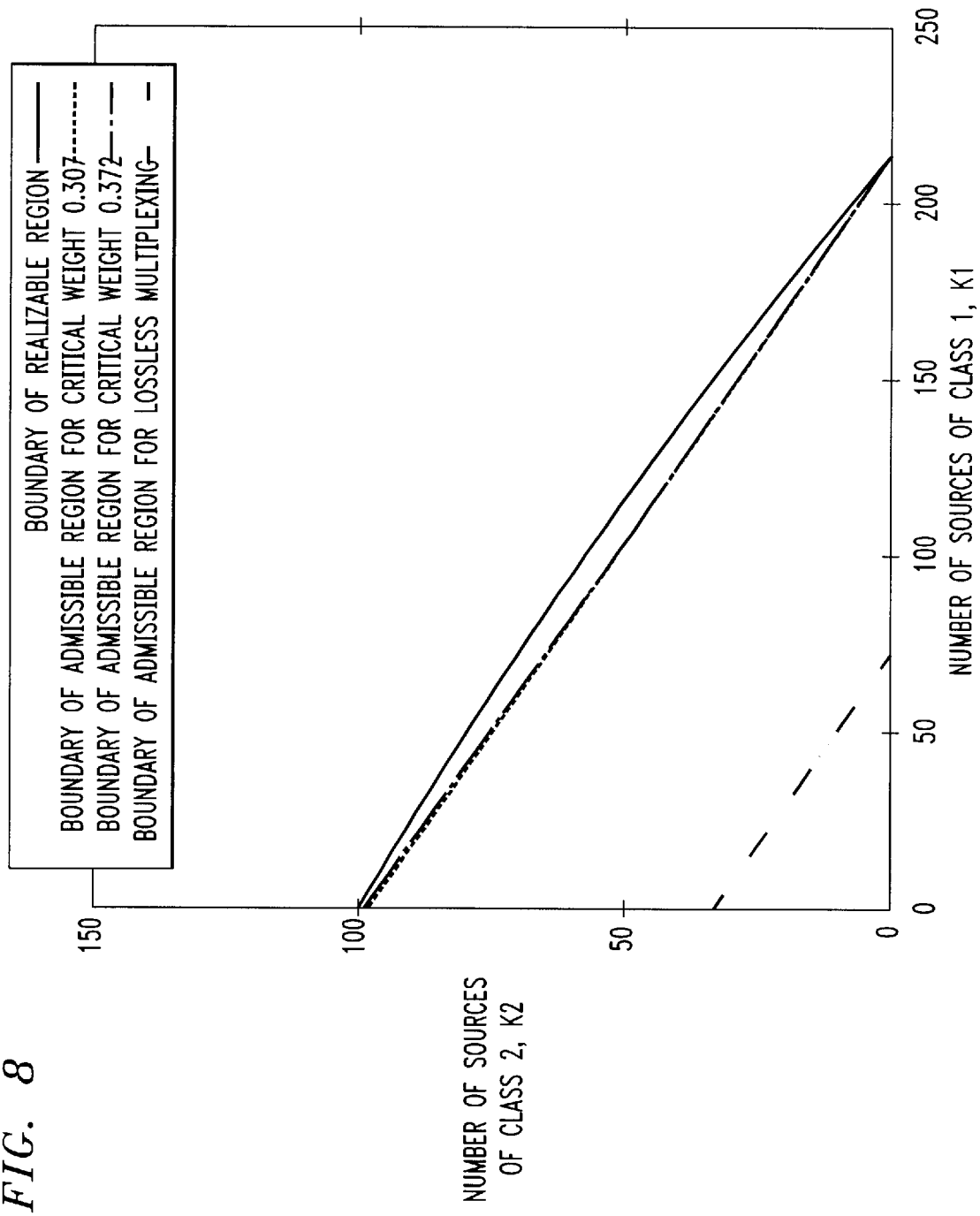
FIG. 8 shows the admissible region corresponding to the critical weights for the two classes of connections and the realizable regions for lossless and statistical multiplexing for Case 2.
Figure 9:
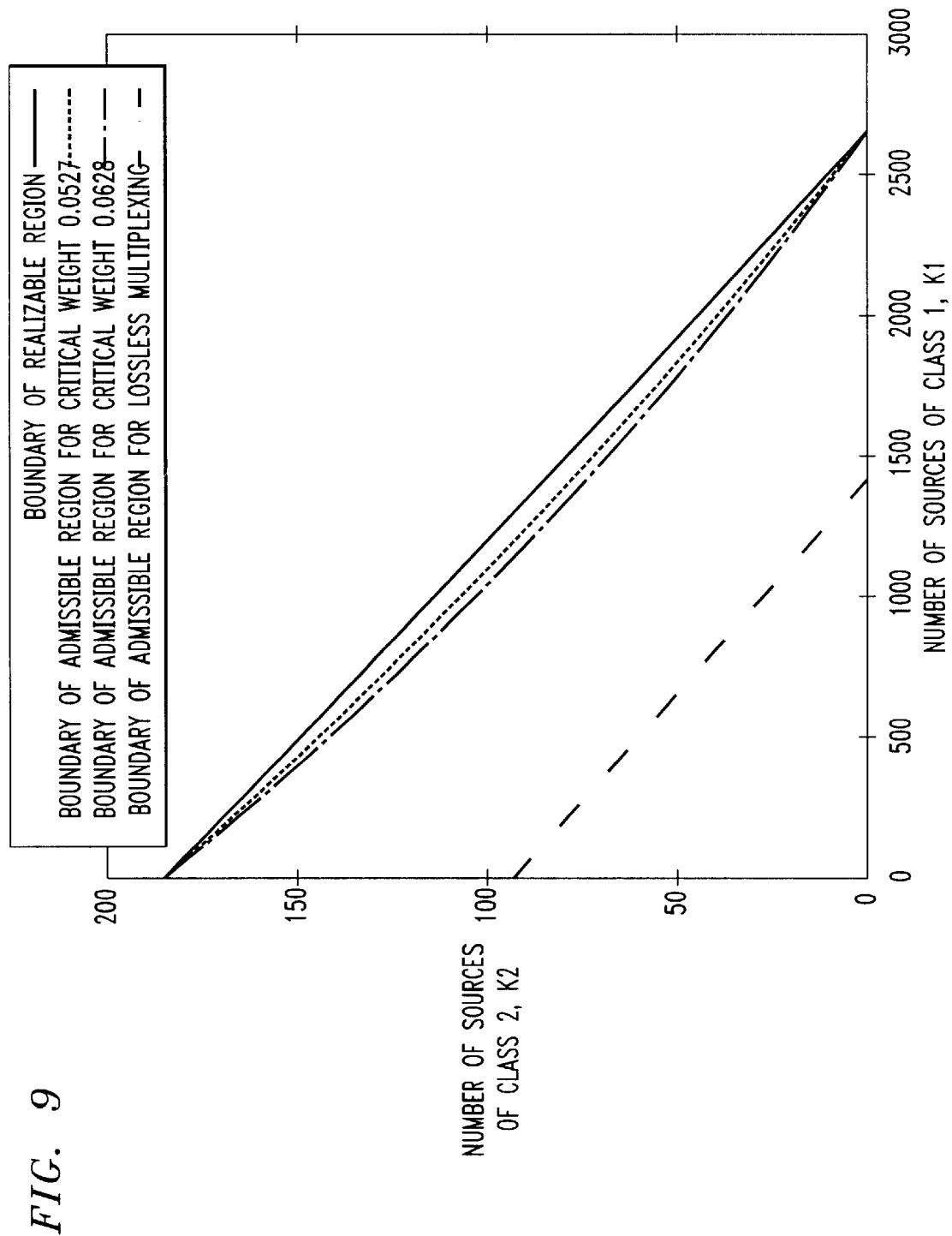
FIG. 9 shows the admissible region corresponding to the critical weights for the two classes of connections and the realizable regions for lossless and statistical multiplexing for Case 3.

Traffic and QoS parameters for the three cases in FIGS. 7, 8 and 9

|  | Case 1 | | Case 2 | | Case 3 | |
| --- | --- | --- | --- | --- | --- | --- |
|  | Class 1 | Class 2 | Class 1 | Class 2 | Class 1 | Class 2 |
| Q (cells) | 250 | 250 | 25 | 250 | 100 | 1000 |
| P (Mbps) | 1.5 | 1.5 | 1.5 | 1.5 | 0.032 | 1.5 |
| r (Mbps) | 0.15 | 0.15 | 0.15 | 0.15 | 0.016 | 0.15 |
| L | $10^{-3}$ | $10^{-9}$ | $10^{-3}$ | $10^{-9}$ | $10^{-3}$ | $10^{-9}$ |
| D (sec) | 0.001 | 0.6 | 0.01 | 0.01 | 0.01 | 0.6 |
| $e_o^{(\cdot)}$ (Mbps) | 1.48 | 0.158 | 0.62 | 1.31 | 0.0318 | 0.48 |

Case 1 is considered in FIG. 7, where the two QoS classes have the same dual leaky bucket parameters, but different maximum delay D and maximum violation, i.e., loss, probability L. The two critical (ratios of) weights $\phi_c^{(1)}$ and $\phi_c^{(2)}$ in this case are found to be 6.4 and 9.2. The boundaries of the admissible regions obtained using these values are plotted. Note that these two source classes are effectively non-homogeneous, i.e., no single weight is sufficient for all traffic mixes. The boundary of the realizable region, which is obtained by varying $\phi$, the ratio of weights, between its two critical values, is also plotted. As in Section 3.9, we observe that the realizable region may be approximately achieved by using only the two critical weights and switching between them on a slow time scale as the desired operating point in connections changes in correspondence to changes in traffic mix. Observe in Table 4.1 that $e_o^{(\cdot)}$ is close to the peak rate for class 1 and to the mean rate for class 2. Also observe that, not surprisingly, the gain in capacity from statistical multiplexing is more pronounced for class 1.

The results for Case 2 are shown in FIG. 8, where the sources differ in their dual leaky bucket parameters and QoS requirements. We determine the critical weights to be 0.372 and 0.307, and find that the two corresponding admissible regions are equivalent, which implies that the two classes are effectively homogeneous. The realizable region in this case is, as expected, only slightly larger than that obtained with either fixed critical weight. We also plot the admissible region for the case of deterministic QoS guarantees, i.e., with $L_j=0$ (j=1, 2) and all other parameters unchanged. The advantage of statistical multiplexing is clearly demonstrated in this figure; there is a factor of 3 in multiplexing gain.

FIG. 9 shows the results for Case 3 where we consider the support of real time and non-real time traffic classes. Class 1 is voice coded at 32 Kb/s and employing silence-detection; its dual leaky bucket parameters are appropriately chosen, and its nodal maximum delay is 10 msec. Class 2 models LAN traffic on a T1 link, which is delay-tolerant but has stringent loss requirement. The critical weights are 0.0527 and 0.0628. Note that the two classes, while quite different in their dual leaky bucket and QoS parameters, are almost effectively homogeneous, i.e., any one of the critical weights provides almost all of the realizable region.

5. End-to-end Heterogeneous Statistical QoS Guarantees with GPS Service

In this section, we consider the problem of supporting two QoS service classes and a best-effort class in a network-wide setting. Our solution approach is based on results from the single node analysis and the following two ideas: (i) The best-effort class is allocated part of the resources in each node for its exclusive use. The best-effort traffic typically consumes these resources; the unused resources, if any, may be too highly variable to be of use for the QoS classes. (ii) The output of each QoS source queue in each node is regulated, where the peak rate is not allowed to exceed a certain value—this value is not necessarily equal to the peak input rate; in fact it is typically smaller to account for the buffering and multiplexing at the node. In our work we limit the peak output rate to $e_o$, which is the lossless effective bandwidth defined in Eq. (2.7). The incorporation of output regulation in GPS is a novel feature, and the motivation behind it is twofold. First, since the admitted QoS sources are allocated resources to meet their contractual requirements, there is no need to allow them access to more resources; excess resources are made available to the best-effort class. Second, output regulation leads to a manageable and more accurate end-to-end resource management, since the output of each queue, which is the input to the queue in the next node, can be tightly characterized. As a consequence, in output regulated GPS our prior single node analysis applies to all nodes in the network. The total bandwidth available to best-effort traffic is a to function of the number of admitted QoS sources and the activity of each source; it will be characterized in more detail below.

We now outline a scheme for analyzing end-to-end resource management of virtual connections, which are either originating at the node or transit (recall that in prior sections we used the term sources to describe all connections.) The bandwidth demand of each connection on each node is characterized by an appropriate pair $(r, e_o)$, where r is the bound on the mean flow rate and $e_o$ is defined in Eq. (2.7). Thus, the single node CAC and GPS designs of Sections 2 and 3 apply. We assume that the end-to-end QoS requirement for class j is specified by $(D_j^T, L_j^T)$, where $$Pr((\text{Total\_delay})_j > D_j^T) \leq L_j^T \, j=1,2$$

and (Total_delay)$_j$ is the maximum end-to-end delay. As before, each node implements output regulated GPS and buffering per connection. In each node, each originating connection of class j is characterized by the dual leaky bucket parameters $(r^{(j)}, Q^{(j)}, P^{(j)})$.

Let (Delay)$_{ji}$ denote the maximum delay for class j at node i, so that $$\sum_i (Delay)_{ji} = (\text{Total\_delay})_j, \, (j = 1, 2), \quad (5.1)$$

and let the QoS requirement for class $j$ at node $i$ be.

$$Pr((Delay)_{ji} > D_{ji}) \leq L_j \quad j = 1, 2; i = 1, \ldots N$$

where $D_{ji}$ is the maximum allocated delay for class j at node i. For instance, $L_j$ may be set equal to $L_j^T/N_j$, where $N_j$ is the maximum number of hops of all connections of class j. For typical applications where $L_j^T$ is small and $N_j$ is not large this approximation is conservative but reasonable.

We first consider the case where the entire delay budget for each class is allocated to the first node in the path of the connection, i.e., $D_{j1}=D_j^T$ and $D_{ji}=0$ for i>1. The motivation behind this is that buffering at the network edges may be cheaper and the traffic smoothing thus obtained alleviates congestion at intermediate and potential bottleneck nodes. In this case, specifically on account of output regulated GPS, the CAC and GPS design in the edge and all intermediate nodes are identical, since the demand of all connections of class j is described by a common ($r^{(j)}$, $e_o^{(j)}$). Note that the actual mean rate of the traffic at an intermediate node may be less than $r^{(j)}$ due to possible loss at the node; however, the probability of loss due to full buffer is, by design, very small.

Next, consider the case of the general allocation of the end-to-end delay budget among the nodes in the path of the connection. In this case, the CAC, GPS design and the value of the output rate are obtained from the prior single node analysis as if the incoming transit traffic is regulated by a dual leaky bucket with parameters ($r^{(\cdot)}$, $D_{on}^{(\cdot)}e_o^{(\cdot)}$, $e_o^{(\cdot)}$), where $e_o^{(\cdot)}$ is the peak output rate from the preceding (upstream) node, which together with $D_{on}^{(\cdot)}$, is obtained from the (lossless multiplexing) analysis of that node. Note that a consequence of the general allocation in the delay budget is a proliferation of classes, leading to considerable computational complexity, even though the solution framework remains unchanged. An alternative view is that the combination of edge-only buffering and the approximation of uniform losses across nodes in each class has the virtue of containing the explosion in complexity.

One alternative to allocating all of the delay to the first node is to make an equal allocation of delay to all nodes in the end-to-end path. This would be acceptable, for example, in a network that is at least approximately homogeneous. Another alternative is to allocate delay to each node in the path in inverse relationship to the link speed or port speed associated with that node. In fact, the pertinent speed for that purpose could be a combination of the port speed and the utilization factor (i.e., the fraction of total capacity being used) of that node.

Those skilled in the art will appreciate that for each proposed end-to-end path, weights need to be designed not only for the first, or edge, node, but also for each intermediate, or interior, node along the path. Significantly, the peak-rate regulation that we have described here makes it possible to impute a three-parameter leaky bucket characterization to the traffic incident upon each interior node, as well as to the edge node. As a consequence, the same design techniques prescribed here for an edge node are also advantageously employed at interior nodes.

As discussed above, the end-to-end path must satisfy quality-of-service (QoS) restrictions on delay as well as other possible performance measures such as loss probability. (Strictly speaking, the delay restriction is a restriction on the probability that delay will exceed a prescribed limit, as discussed above.) We have discussed, above, various ways to allocate the end-to-end delay budget over the nodes in a proposed path. (Similar procedures can be used to allocate the end-to-end loss probability.) In accordance with allocations of that kind, end-to-end QoS requirements are decomposed into local sets of QoS requirements, each such set applying to a particular node along the path. Significantly, the design procedure is carried out at each interior node in such a way that the pertinent local set of QoS requirements is satisfied.

Those skilled in the art will also appreciate that admission to a proposed path will fail if there are inadequate resources at any point along the path. Thus, in particular, each interior node along the path must be able to accept a proposed connection without violating the QoS requirements of all existing connections; that is, without exiting its respective realizable set. We can speak of an end-to-end realizable set, which consists of the intersection, over the entire proposed path, of the realizable sets of all the included nodes. One aspect of admission control is then to determine whether, upon acceptance of a proposed connection, the network will remain within its end-to-end realizable set.

It is advantageous for admission control to be carried out at the edge node which is the first node of the proposed path. Thus, in one illustrative scenario, the entity that administers admission control checks each node, in succession, along the end-to-end path. If the proposed connection lies within the realizable region for each and every one of the nodes along the path, the administrative entity so informs the edge node, and the connection may be established. If, on the other hand, this test fails for at least one such node, the edge node is so informed, and admission is denied, or an alternate end-to-end path is proposed.

5.1 Characterization of the Best-Effort Channel

As pointed out above, for each node in the network, the bandwidth available to the best-effort traffic consists of a fixed provisioned component and a variable component which is a function of the carried QoS traffic. The variable bandwidth component has large fluctuations at the time-scale of QoS connections, i.e., the time-scale of connection arrivals and departures, and small superimposed fluctuations at the burst time-scale, i.e. the time-scale of on-off dynamics of the admitted connections. The bandwidth available to the best effort traffic, $C_{be}$ may be characterized by a modulated Brownian motion. The modulating process captures the slow-time scale component and models the number of admitted calls of each QoS source type and their dynamics (arrivals and departures.) For a given state of the modulating process K=($K_1, K_2, \ldots$), where $K_j$ is the number of admitted connections of QoS class j, the Brownian motion captures the fast time-scale component. Specifically, the mean and the variance of $C_{be}(K)$ are given as:

$$\text{Mean}(C_{be}(K)) = C - \sum_j K_j r^{(j)} \qquad (5.2)$$

where C is the nodal bandwidth, and $$\text{Var}(C_{be}(K)) = \sum_j K_j (e_o^{(j)})^2 \omega^{(j)} (1 - \omega^{(j)}) \qquad (5.3)$$

Recall that $r^{(j)}=e_o^{(j)}\omega^{(j)}$. In the simplest connection model, arrivals are Poisson and holding periods are exponentially distributed, with rates which may depend on the class. For such models, the modulating connection process has a steady state distribution which is product-form and easily computed. We remark that the modulated Brownian motion characterization of the best-effort channel is appropriate to the general expectations of relatively higher loss, which justifies the diffusion, rather than the large deviations asymptotic, regime. Techniques for analysis of such modulated Brownian motion may be found in R. L. Karandikar and V. G. Kulkarni, "Second order fluid flow models: reflected Brownian motion in a random environment", *Opns. Res.* 45, 1995, pp. 77–88 and S. Assmussen, "Stationary distribution for fluid flow models with or without Brownian motion", *Stochastic Models* 11, 1995, pp. 21–49.

6. Conclusions

In this invention, we have considered the analysis and design of GPS schedulers under statistical QoS guarantees.

While the basic results are for a single node, the general setting considered is that of a network of GPS schedulers supporting two QoS classes and a best effort class. The connections are regulated by dual leaky buckets and the output of each connection buffer is peak rate-controlled. The latter feature makes the bandwidth in excess of what is need to satisfy the demand of the QoS sources available to the best effort traffic; it also facilitates the end-to-end analysis since the output of each connection queue can be tightly characterized. We have derived the realizable admissible connection region, which is the largest possible admissible region obtained by varying the weights. We have derived the notion of critical weights, and shown that the realizable region can be found by varying the weights only between the two critical weights. We have shown further that the realizable region can be closely approximated by using one of the critical weights, or by switching between the two only once as the operating point shifts due to changes in the traffic mix. For the best effort traffic we have developed a characterization of its share of the link bandwidth which should be useful in its analysis and engineering. The validity of our overall analytical and design results as well as the considerable advantage of using statistical QoS guarantees over deterministic guarantees has been demonstrated by numerical examples.

This work can be extended in a number of interesting directions. The analysis may be extended to the general case of more than two source classes. Multiplicity of source classes in our framework arises not only from multiplicity of QoS requirements, but also from the existence of multiple traffic classes (defined by different dual leaky bucket parameters). Algorithms could be devised which systematically derive the realizable region and the critical weights, based on extensions of the results for the two-class case.

Another possible extension is to hierarchical GPS schedulers. These schedulers are attractive since they provide isolation between classes and flexibility in bandwidth allocation. It is also of interest to develop hierarchical analysis of such schedulers, and which may be used as an approximation the analysis of to the non-hierarchical schedulers.

Another issue which is worth investigating further is how the results are influenced by the coexistence of "statistically multiplexable" and "non-statistically multiplexable" sources, as defined in A. I. Elwalid, D. Mitra and R. H. Wentworth, "A new approach for allocating buffers and bandwidth to heterogeneous, regulated traffic in an ATM node", *IEEE J. Select. Areas Commun.* 13:(6), 1995, pp. 1115–1127, and in particular, how the linearity of the admissible region is affected.

Many more variations of the preferred embodiment of the invention are possible without departing from the spirit, the essential criteria and the rules and methods of this invention. The proper scope of this invention is indicated by the appended claims, rather than by the foregoing description and all variations which come within the meaning and range of equivalency of the claims are therefore intended to be covered by the claims stated hereinafter.

We claim:

1. A method for Generalized Processor Sharing (GPS) scheduling and network control, wherein j (j=1, 2) classes of connections are presented to a GPS scheduler at a node with a total link bandwidth C, each class j comprising $K_j$ connections and characterized by a quality of service (QoS) loss probability $L_j$, and a lossless multiplexing bandwidth $e_{oj}$, each connection having an associated buffer and allocated a weight $\phi_j$ that determines the connection's share of bandwidth, the method comprising:

computing the number of connections $K_1$ in a first class of connections and the weight $\phi_1$ associated with each connection in the first class of connections; and computing the number of connections $K_2$ in a second class of connections and the weight $\phi_2$ associated with each connection in the second class of connections, such that the following expressions are satisfied:

$$Pr\left[\phi_1 \sum_{i=1}^{K_1-1} \xi_i^{(1)} + \phi_2 \sum_{i=1}^{K_2} \xi_i^{(2)}\right] > \phi_1(C/e_o^{(1)} - 1) \leq L_1$$

$$Pr\left[\phi_1 \sum_{i=1}^{K_1} \xi_i^{(1)} + \phi_2 \sum_{i=1}^{K_2-1} \xi_i^{(2)}\right] > \phi_2(C/e_o^{(2)} - 1) \leq L_2$$

$$Pr(\xi_i^{(j)}=1)=1-Pr(\xi_i^{(j)}=0)=\omega_i^{(j)}$$

wherein $\xi_i^{(j)}$ is the activity indicators for the $i^{th}$ connection of class j that takes the value 1 if the connection is active and 0 otherwise, and $\omega_i^{(j)}$ is the fraction of time that the corresponding buffer and bandwidth is utilized for the $i^{th}$ connection of class j.

2. The method of claim 1 further comprising the step of determining pinned corner points $\overline{K}_1^{(1)}$ and $\overline{K}_2^{(2)}$ for the first and second classes of connections respectively, such that the following expressions are satisfied:

$$Pr\left[\sum_{i=1}^{\overline{K}_1^{(1)}-1} \xi_i^{(1)} > (C/e_o^{(1)} - 1)\right] \leq L_1$$

$$Pr\left[\sum_{i=1}^{\overline{K}_2^{(2)}-1} \xi_i^{(1)} > (C/e_o^{(2)} - 1)\right] \leq L_2$$

wherein $\overline{K}_1^{(1)}$ and $\overline{K}_2^{(2)}$ are the maximum number of connections of class 1 and class 2, respectively, that satisfy its QoS when there are no connections of the complementary class.

3. The method of claim 2 further comprising the step of determining design corner points $\overline{K}_1^{(2)}(\phi)$ and $\overline{K}_2^{(1)}(\phi)$ for the first and second classes of connections respectively, such that the following expressions are satisfied:

$$Pr\left[\sum_{i=1}^{\overline{K}_2^{(1)}(\phi)} \xi_i^{(2)} > \phi(C/e_o^{(1)} - 1)\right] \leq L_1$$

$$Pr\left[\sum_{i=1}^{\overline{K}_1^{(2)}(\phi)} \xi_i^{(1)} > \frac{1}{\phi}(C/e_o^{(2)} - 1)\right] \leq L_2$$

wherein $\overline{K}_1^{(1)}(\phi)$ and $\overline{K}_2^{(2)}(\phi)$ and are the maximum number of connections of class 1 and class 2, respectively, that while active for a fixed $\phi$ receives resources to satisfy its QoS.

4. The method of claim 3 further comprising the step of determining the critical weights $\phi_c^{(1)}$ and $\phi_c^{(2)}$ for the first and second classes of connections respectively, such that the following expressions are satisfied:

$$\overline{K}_2^{(1)}(\phi_c^{(1)}) = \overline{K}_2^{(2)}$$

$$\overline{K}_1^{(2)}(\phi_c^{(2)}) = \overline{K}_1^{(1)}$$

wherein $\phi_c^{(1)}$ and $\phi_c^{(2)}$ are those values for class 1 and class 2 connections, respectively, for which QoS is satisfied when the number of connections of complementary class $j_c$ is $\overline{K}_{j_c}^{(j_c)}$, and there is only one connection of class 1 and class 2, respectively.

5. The method of claim 4 further comprising the step of defining a boundary of realizable admissible weights for the GPS scheduler using a single critical weight when the following expression is satisfied:

$$\phi_c^{(1)} \leq \phi_c^{(2)}.$$

6. The method of claim 4 further comprising the step of defining a boundary of realizable admissible weights for the GPS scheduler using two critical weights when the following expression is satisfied:

$$\phi_c^{(2)} \leq \phi_c^{(1)}.$$

7. The method of claim 6 further comprising the step of specifying a third class of connections referred to as a best effort class of connections.

8. The method of claim 7 further comprising the step of maximizing the bandwidth available to the best effort class of connection by minimally satisfying the quality of service (QoS) loss probabilities $L_1$ and $L_2$ for the first and second classes of connections.

9. The method of claim 1 wherein the lossless multiplexing bandwidth $e_o$ for each class of connections is dependent on the dual leaky bucket regulator parameters for that class of connections.

10. The method of claim 1 wherein the quality of service (QoS) for each class of connections is further specified by a delay D.

11. The method of claim 10 wherein the quality of service (QoS) loss probability L and delay D for each class of connections is specified by the user.

12. The method of claim 11 wherein the first class of connections has higher quality of service (QoS) parameters compared to QoS parameters for the second class of connections.

13. The method of claim 8 further comprising the step of setting peak transmission bandwidths for the first and second classes of connections to be equal to the lossless multiplexing bandwidth for that particular class of connection.

14. A method for Generalized Processor Sharing (GPS) scheduling and network control with QoS guarantees, wherein at least two classes of connections are presented to a GPS scheduler at a node, the method comprising:
   computing pinned corner points for a first class of connections and a second class of connections;
   computing design corner points for the first and second classes of connections;
   computing critical weights for the first and second classes of connections based on the pinned and design corner points for each class of connection; and
   defining a boundary of realizable admissible weights for the GPS scheduler based on the critical weight for each class of connection.

15. The method of claim 14 further comprising the step of specifying a third class of connections referred to as a best effort class of connections.

16. The method of claim 15 further comprising the step of maximizing the bandwidth available to the best effort class of connection by minimally satisfying quality of service (QoS) requirements for the first and second classes of connections.

17. The method of claim 14 further comprising the step of specifying a lossless multiplexing bandwidth for each class of connections that is dependent on the dual leaky bucket regulator parameters for that class of connections.

18. The method of claim 14 further comprising the step of specifying by the user quality of service (QoS) parameters for each class of connections.

19. The method of claim 18 wherein the first class of connections has higher quality of service (QoS) parameters compared to QoS parameters for the second class of connections.

20. The method of claim 16 further comprising the step of setting peak transmission bandwidths for the first and second classes of connections to be equal to a lossless multiplexing bandwidth for that particular class of connection.

21. A method for Generalized Processor Sharing (GPS) scheduling and network control with QoS guarantees, wherein at least two classes of connections are presented to a GPS scheduler at a node, the method comprising:
   computing pinned corner points for a first class of connections and a second class of connections;
   computing design corner points for the first and second classes of connections;
   computing critical weights for the first and second classes of connections based on the pinned and design corner points for each class of connection;
   defining a boundary of realizable admissible weights for the GPS scheduler based on the critical weight for each class of connection;
   specifying a third class of connections as a best effort class of connections;
   setting peak transmission bandwidths for the first and second classes of connections to be equal to a lossless multiplexing bandwidth for that particular class of connection; and
   maximizing the bandwidth available to the best effort class of connection by minimally satisfying quality of service (QoS) requirements for the first and second classes of connections.

22. The method of claim 21 further comprising the step of specifying the lossless multiplexing bandwidth for each class of connections based upon the dual leaky bucket regulator parameters for that class of connections.

23. The method of claim 21 further comprising the step of specifying by the user the quality of service (QoS) parameters for each class of connections.

24. The method of claim 21 wherein the first class of connections has higher quality of service (QoS) parameters compared to QoS parameters for the second class of connections.

* * * * *